US009270944B2

(12) United States Patent
Brooks et al.

(10) Patent No.: US 9,270,944 B2
(45) Date of Patent: Feb. 23, 2016

(54) METHODS AND APPARATUS FOR CONTENT DELIVERY NOTIFICATION AND MANAGEMENT

(75) Inventors: Paul D. Brooks, Weddington, NC (US); Remi Rieger, Charlotte, NC (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 2152 days.

(21) Appl. No.: 11/706,620

(22) Filed: Feb. 14, 2007

(65) Prior Publication Data

US 2008/0192820 A1    Aug. 14, 2008

(51) Int. Cl.
*H04N 21/2385* (2011.01)
*H04N 21/472* (2011.01)
*H04L 29/08* (2006.01)
*H04N 21/61* (2011.01)
*G06F 11/34* (2006.01)
*H04L 12/911* (2013.01)
*H04L 12/26* (2006.01)
*H04N 7/173* (2011.01)
*H04N 21/24* (2011.01)
(Continued)

(52) U.S. Cl.
CPC ............ *H04N 7/17318* (2013.01); *G06F 11/34* (2013.01); *H04L 47/70* (2013.01); *H04L 67/325* (2013.01); *H04N 21/2385* (2013.01); *H04N 21/2402* (2013.01); *H04N 21/47202* (2013.01); *H04N 21/47214* (2013.01); *H04N 21/485* (2013.01); *H04N 21/4882* (2013.01); *H04N 21/6125* (2013.01)

(58) Field of Classification Search
CPC .................... H04N 21/2385; H04N 21/47202; G06F 11/008; H04L 67/325
USPC .......... 725/34, 86–87, 91, 93, 95–97, 37–40, 725/58, 74, 78, 80, 82, 85, 88, 89, 100; 370/229, 230, 232–235; 709/223, 226, 709/230, 232, 234

See application file for complete search history.

(56) References Cited

U.S. PATENT DOCUMENTS 5,673,253 A * 9/1997 Shaffer .......................... 370/229
5,884,037 A * 3/1999 Aras et al. ..................... 709/226
7,012,891 B1    3/2006 Chandran et al.
(Continued)

FOREIGN PATENT DOCUMENTS

WO    WO 2007136399    9/2006
WO    WO 2008016786    7/2007

*Primary Examiner* — Benjamin R Bruckart
*Assistant Examiner* — Jason Thomas
(74) *Attorney, Agent, or Firm* — Gazdzinski & Associates, PC

(57) ABSTRACT

Apparatus and methods for handling situations where requested services require more network capacity than presently available, and notifying network users of an delay in providing such services. In one embodiment, the invention comprises apparatus and methods for the detection of capacity (e.g., bandwidth) shortage, determination of a delayed delivery mode and schedule for the delivery of the requested content, and notification of the availability of the content to the user via, e.g., on-screen display, e-mail, text message, or other mode. The user can also specify their own notification preferences and delivery time. Requests for and delivery of the content may be performed from/to different locations as well. Network server apparatus, consumer premises equipment (CPE), and a software architecture adapted to implement the foregoing functionality, are also disclosed.

14 Claims, 15 Drawing Sheets

(51) Int. Cl.
*H04N 21/485* (2011.01)
*H04N 21/488* (2011.01)

(56) References Cited

U.S. PATENT DOCUMENTS

| | | | |
|---|---|---|---|
| 7,150,017 B1* | 12/2006 | Vogl et al. | 718/102 |
| 7,207,055 B1 | 4/2007 | Hendricks | |
| 7,274,661 B2 | 9/2007 | Harrell | |
| 7,283,803 B2 | 10/2007 | Karaoguz | |
| 7,324,523 B2 | 1/2008 | Dacosta | |
| 7,340,759 B1 | 3/2008 | Rodriguez | |
| 7,574,726 B2* | 8/2009 | Zhang et al. | 725/95 |
| 2002/0032754 A1 | 3/2002 | Logston et al. | |
| 2002/0046404 A1* | 4/2002 | Mizutani | 725/58 |
| 2002/0194607 A1* | 12/2002 | Connelly | 725/87 |
| 2003/0005454 A1* | 1/2003 | Rodriguez et al. | 725/89 |
| 2003/0028884 A1* | 2/2003 | Swart et al. | 725/51 |
| 2003/0056217 A1 | 3/2003 | Brooks | |
| 2004/0013136 A1* | 1/2004 | Mailhot et al. | 370/537 |
| 2004/0181800 A1* | 9/2004 | Rakib et al. | 725/25 |
| 2004/0210936 A1* | 10/2004 | Rao et al. | 725/87 |
| 2005/0071882 A1* | 3/2005 | Rodriguez et al. | 725/95 |
| 2005/0160470 A1* | 7/2005 | Strauss | 725/115 |
| 2005/0289619 A1 | 12/2005 | Melby | |
| 2006/0130107 A1 | 6/2006 | Gonder | |
| 2006/0130113 A1 | 6/2006 | Carlucci | |
| 2006/0218601 A1* | 9/2006 | Michel | 725/87 |
| 2006/0218604 A1 | 9/2006 | Riedl | |
| 2006/0236353 A1* | 10/2006 | Cheng et al. | 725/90 |
| 2007/0022459 A1 | 1/2007 | Gaebel | |
| 2007/0028260 A1* | 2/2007 | Williams et al. | 725/31 |
| 2007/0076728 A1 | 4/2007 | Rieger | |
| 2007/0094691 A1 | 4/2007 | Gazdzinski | |
| 2007/0121678 A1 | 5/2007 | Brooks | |
| 2007/0204311 A1* | 8/2007 | Hasek et al. | 725/91 |
| 2007/0217436 A1 | 9/2007 | Markley | |
| 2007/0263653 A1 | 11/2007 | Hassan et al. | |
| 2007/0276925 A1 | 11/2007 | La Joie | |
| 2007/0276926 A1 | 11/2007 | LaJoie | |
| 2008/0098212 A1 | 4/2008 | Helms | |
| 2008/0109823 A1* | 5/2008 | Whitfield et al. | 719/318 |
| 2008/0152116 A1* | 6/2008 | Sylvain | 379/216.01 |
| 2008/0177998 A1 | 7/2008 | Apsangi | |

* cited by examiner

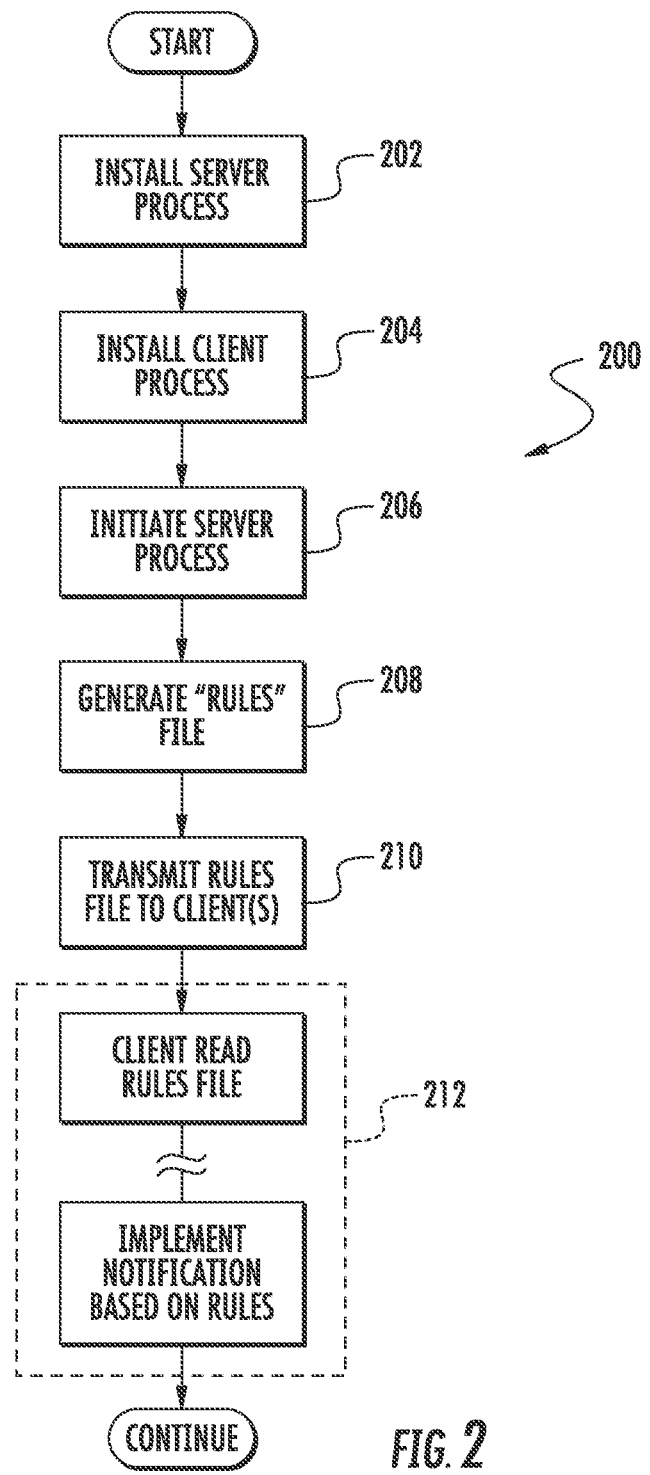

| | |
|---|---|
| SERVICE POOL EXAMPLE | |
| THE DISNEY CHANNEL | 3.75 Mbits |
| SCI-FI | 4.25 Mbits |
| THE GOLF CHANNEL | 3.50 Mbits |
| THE HISTORY CHANNEL | 3.75 Mbits |
| HOME & GARDON TELEVISION | 4.25 Mbits |
| TUNER CLASSIC MOVIES | 3.50 Mbits |
| ESPN-2 | 3.75 Mbits |
| THE DISCOVERY CHANNEL | 4.25 Mbits |
| AMERICAN MOVIE CLASSICS | 3.50 Mbits |
| TNT | 3.75 Mbits |
| ABC FAMILY CHANNEL | 4.25 Mbits |
| TBS SUPERSTATION | 3.50 Mbits |
| A&E | 3.75 Mbits |
| THE WEATHER CHANNEL | 4.25 Mbits |
| NICKELODEON | 3.50 Mbits |
| USA NETWORK | 16.75 Mbits |
| LIFETIME TELEVISION | 4.25 Mbits |
| DOPPLER WEATHER RADAR | 3.63 Mbits |
| SPIKE TV | 3.75 Mbits |
| CNN HEADLINE NEWS | 3.75 Mbits |
| CNN | 4.00 Mbits |
| CNBC | 19.20 Mbits |
| VH1 | 4.25 Mbits |
| E! | 3.50 Mbits |
| BLACK ENTERTAINMENT TELEV | 3.75 Mbits |
| MTV MUSIC TELEVISION | 4.25 Mbits |
| CMT | 3.50 Mbits |
| COMEDY CENTRAL | 3.75 Mbits |
| COURT TV | 4.25 Mbits |
| FOX SPORTS SOUTHWEST | 3.63 Mbits |
| ESPN | 3.75 Mbits |
| TELEMUNDO NETWORK | 3.75 Mbits |
| TV LAND | 4.00 Mbits |
| FOX NEWS CHANNEL | 3.75 Mbits |
| FOOD NETWORK | 3.75 Mbits |
| WGN | 15.00 Mbits |
| ANIMAL PLANET | 19.20 Mbits |

FIG. 3D

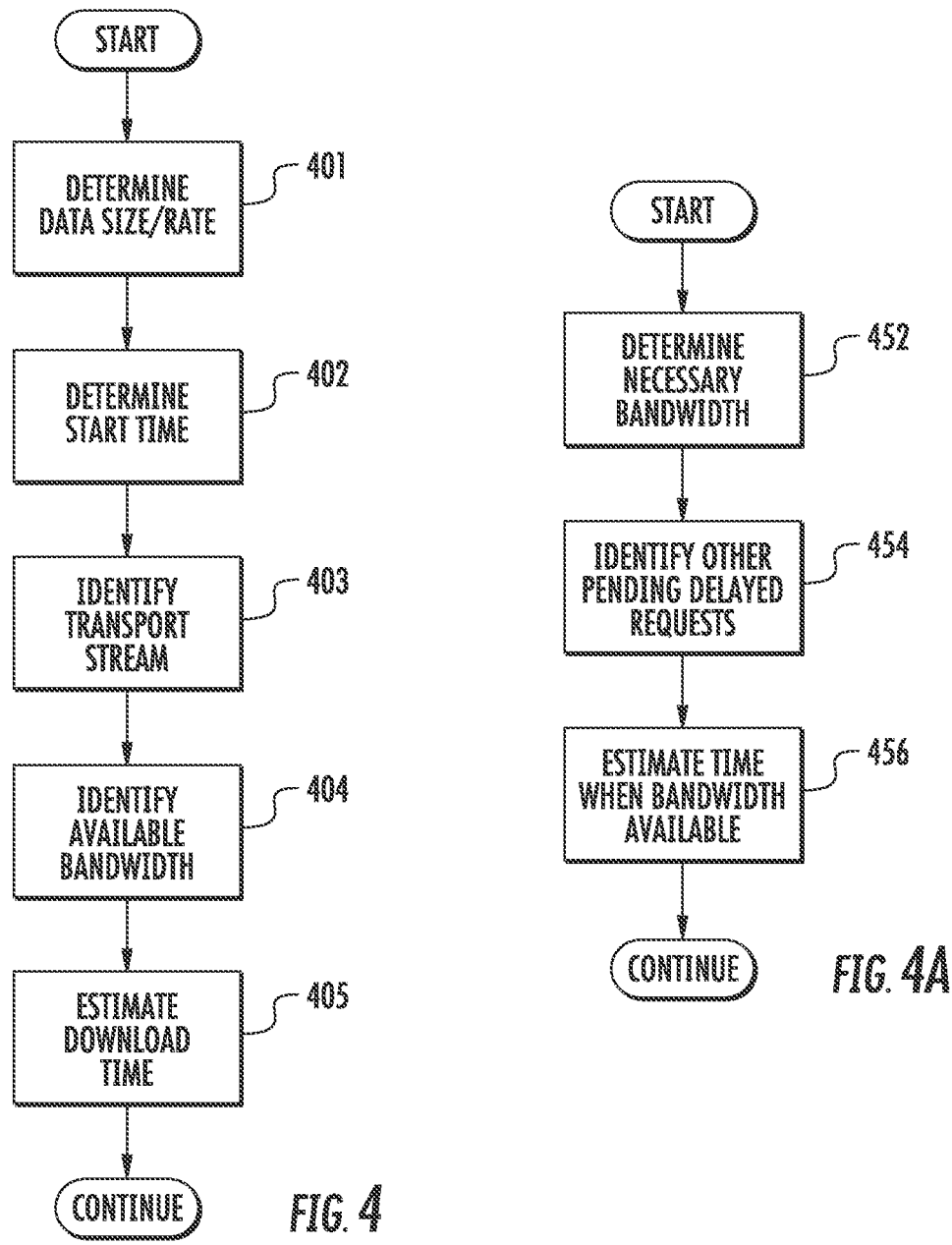

METHODS AND APPARATUS FOR CONTENT DELIVERY NOTIFICATION AND MANAGEMENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content delivery over a network. More particularly, the present invention is in one exemplary aspect related to apparatus and methods for the detection of capacity (e.g.,. bandwidth) constraints, delivery of requested content, and notification of content availability, latency, or other operational considerations.

2. Description of Related Technology

In digital television, video and audio information is encoded into digital data, often represented and transmitted as one or more streams of packets.

MPEG-2 is a standard for digital video used in terrestrial, cable, and satellite transmission of television signals. Using MPEG-2, standard-definition (SD) television programming can be transmitted in acceptable quality using a bit rate of 3 to 4 Mbit/s (megabits per second).

In the United States, digital television programming is transmitted in cable television systems using carrier signals with a 6 MHz nominal bandwidth. Depending on the modulation scheme employed, a digital carrier occupying 6 MHz bandwidth can carry a variable number of standard definition television channels (typically greater than 1). For example, using a 256 QAM modulation scheme, an information rate of approximately 38.8 Mbit/s can be achieved in a carrier that fits in a 6-MHz portion of the spectrum. Even for high-definition (HD) television services, a 38.8 Mbit/s carrier typically can carrier 2 services in the same carrier.

To facilitate multiplexing multiple services into the same digital carrier, (variable-length) packets of digital video and audio data may be encapsulated in fixed-length packets. MPEG-2 provides such a multiplexing mechanism.

An MPEG-2 transport stream consists of a sequence of 188-byte (fixed-length) packets, which may belong to multiple constituent packet streams that are multiplexed together to form the transport stream. Packets in an MPEG-2 transport stream that belongs to the same constituent stream are identified by a common identifier in the header portion of the packets. Such an identifier is called a "program identifier", or PID, in MPEG-2 terminology.

Unused packets that do not belong to any of the constituent streams in an MPEG-2 transport stream are called "null packets". In MPEG-2, null packets are identifiable by a special PID value (0x1FFF, i.e. hexadecimal 1FFF).

In the context of MPEG-2, for example, a transport stream may in general carry multiple programs or services. Each program or service may in turn be composed of multiple constituent streams of packets, each of which having a common PID.

As is practiced today, cable television systems typically transmit MPEG-2 transport streams on a one-transport-stream-per-radio-frequency-carrier basis.

In a typical cable television system, programming content is received from programming providers at a central facility (e.g., a headend), typically via satellite transmission or other such modality. The received programming is processed (which may include, among others, a combination of: decryption, add/drop remultiplexing, and re-encryption) and then retransmitted, via a distribution network, to a population of subscribers.

Modern cable television systems often have a hybrid fiber-coax (HFC) architecture. In such a system, signals from the headend are transmitted to fiber nodes (a.k.a. optical nodes) on a fiber optic network. The fiber nodes are distributed throughout the geographic area served by the cable system. In some HFC systems, there are intermediate-level facilities called distribution hubs.

At a fiber node, signals received from a hub or the headend over the optical network are converted into electrical signals. The electrical signals are distributed to the subscribers in the area served by the fiber node over a coaxial cable network, possibly with splitting and re-amplification.

Within the area served by a fiber node, the available analog bandwidth in the coaxial cable network is shared by all the subscribers served by the fiber node. The signals transmitted to different fiber nodes in general need not be identical.

In earlier cable television systems (especially before the late 1990s), it was common for carrier signals of all services to be transmitted to all subscriber locations, regardless of whether individual subscribers are authorized to receive particular services, or whether any subscriber is actually viewing a particular service. This arrangement is acceptable where it is likely that the same signals are needed by many subscribers, such as in broadcast and pre-scheduled pay-per-view services.

However, cable systems, especially the coaxial cable portions of them, have a limited bandwidth. There is a limit on the number of audio/video/data streams that can be transmitted simultaneously to, or through, a particular part of the network.

With video-on-demand (VOD) type services, transmitting all signals to all subscriber locations becomes problematic. In VOD, individual subscribers may start, stop, pause, forward, rewind a program at arbitrary and unpredictable times. This necessitates the creation of a separate video/audio/data stream for each subscriber.

With VOD and individualized streams, it may be advantageous, from a resource management point of view, to transmit individualized streams only to relevant portions of the network. This may be implemented by limiting the transmission of a signal only to the fiber node(s) that actually need it. The goal is to increase the number of video/audio/data streams and individualized sessions supportable using a given amount of bandwidth.

In recent broadcast switched architectures (BSA), a signal is transmitted to a portion of a cable system (e.g. a fiber node or a subscriber location) only if some subscriber is receiving it. This may mean that, at least for some services, bandwidth is dynamically allocated from one or more carriers when service/content is requested.

An advantage of BSA is that the total number of services that can be offered can exceed a cable system's ability to transmit the services simultaneously to a particular portion of the system (say a fiber node). For example, if a cable system allocates, for broadcast services, enough bandwidth to deliver 500 services simultaneously, BSA can allow more than 500 broadcast services to be offered using the same allocation, so long as, on a per fiber node basis, the total number of requested broadcast streams at any time stays within the limit.

A potential issue with this arrangement is that, depending on subscriber request patterns, it is possible that sometimes service requests cannot be fulfilled because the resulting bandwidth requirement would exceed the available bandwidth. This may happen for example when there are too many simultaneous VOD sessions. This may also happen when the number of distinct broadcast or other services requested exceeds the bandwidth allocation.

In prior art systems, when a service request cannot be fulfilled because of resource unavailability, the request may simply be denied, which may result in significant subscriber frustration. This is especially true since the user is given no meaningful information as to the reason for the unavailability of the requested content, or when the requested content will be available if ever. The user must then either decide not to obtain (e.g., watch) the content, or keep trying back at subsequent times to see if the content is available. This latter approach is highly inefficient for the user from a time perspective, and also frustrates any planning by the user around watching or using the content.

Accordingly, what is needed are improved apparatus and methods which provide the user with cogent and timely information relating to the availability (or non-availability) of requested content. Ideally, such information would be available in real-time (e.g., substantially at the time of request), and would allow the user to plan their subsequent activities relating to the content without having to guess or repetitively request the same content. Alternatively, where the information is not immediately available, the user could at least be assured of notification (whatever they may be doing) when the content does become available.

Such improved apparatus and methods would also ideally allow the user to program or control the delivery of content at a time suitable to their needs. It would further provide flexibility as to the delivery paradigm used (e.g., streaming in "real time", download/playback, etc.).

SUMMARY OF THE INVENTION

The present invention addresses the foregoing needs by disclosing apparatus and methods for detecting bandwidth constraints or other relevant operational conditions, providing delayed or real-time delivery of requested content, and associated notification functions relating to content availability.

In a first aspect of the invention, a method of providing notification in a content based network is disclosed. In one embodiment, the method comprises: receiving a request for delivery of content from an entity in communication with the network; evaluating at least one parameter related to available bandwidth of the network; when the evaluating indicates that the available bandwidth is limited, delaying the servicing of the request for content; and providing a notification based at least in part on the delaying.

In one variant, the content based network comprises a cable television network, and the request for content comprises a signal or message received from a subscriber of the network issued via their consumer premises equipment (CPE).

In another variant, the evaluation of at least one parameter related to available bandwidth is based at least in part on actual bandwidth allocation then existing within the network.

In still another variant, the evaluation of at least one parameter related to available bandwidth is based at least in part on a predictive or speculative bandwidth allocation within the network.

In a second aspect of the invention, a method of processing requests for content delivery in a content-based network is disclosed. In one embodiment, the method comprises: receiving a request for content from a client device in operative communication with the network; evaluating the network's capacity to fulfill the request substantially in real time; determining, where the capacity is not available, a delayed delivery mode to be used to deliver the content; and providing a notification to at least the client device relating to the non-availability and the delayed delivery mode.

In one variant, the request for content comprises a subscriber tuning to a given program channel, and the evaluating capacity comprises determining a predicted bandwidth allocation for some time in the future.

In another variant, providing a notification comprises providing different notifications for different types of the request for content.

In still another variant, the request for content is subsequently serviced when the capacity to fulfill is determined to be available, and according to a prioritization scheme of other such requests for content from other respective network client devices.

In yet another variant, the content-based network comprises a cable network, and the client device is disposed within an IP-based network external to the cable network but in communication therewith via at least one routing apparatus. The request may be optionally serviced via a personal content server.

In a third aspect of the invention, a method of delayed-delivery of content requests in a content based network is disclosed. In one embodiment, the method comprises; receiving a request for content from client device having at least one tuner, or a proxy thereof; evaluating available bandwidth in the network to fulfill the request for content; when the available bandwidth is insufficient to fulfill the request, issuing a notification of delay to the client device or the proxy; and delivering the requested content after sufficient bandwidth becomes available. The delivery of content comprises receiving the content using the at least one tuner.

In one variant, the at least one tuner comprises a first and second tuner, and the receiving using at least one tuner comprises: utilizing at least the first of the tuners to receive the requested content; and utilizing at least the second of the tuners to simultaneously receive a program stream.

In another variant, the availability of sufficient bandwidth is provided at least in part by opportunistic or residual bandwidth.

In another variant, the request is issued by the client device, and the notification is delivered to the proxy, the proxy comprising a mobile device selected from the group consisting of: (i) cellular phone; (ii) PDA, and (iii) laptop computer.

In still another variant, the at least on tuner is capable of receiving at most one transport stream at one time, and the method further comprises: receiving a request to tune to a transport stream, thereby resulting in a resource conflict with the act of delivering; wherein the conflict is handled by complying with request and aborting or suspending the delivering.

In yet another variant, the network comprises a broadcast switched architecture (BSA) network, and the request is received by a BSA switch apparatus.

In a fourth aspect of the invention, a software architecture for use in a content-based network is disclosed. In one embodiment, the network comprises at least one content source and a plurality of client devices, and the software architecture is adapted to provide delayed delivery of content and notification thereof, and comprises: a first process associated with the source; and a second process disposed on respective ones of at least a portion of the plurality of client devices. The first process is adapted to: evaluate at least one aspect of the network to determine if sufficient capacity is available to immediately service a content request; where the capacity is not sufficient, determine at least a time when the capacity is projected to be sufficient; and issue a notification to an entity making the request indicating at least the time.

In one variant, the network comprises a broadcast switched architecture (BSA) network, and the request is received by a BSA switch apparatus.

In another variant, the network comprises a VOD-capable network, and the request is received by a VOD server to instantiate an on-demand session.

In a fifth aspect of the invention, consumer premises equipment (CPE) adapted for delayed content delivery notification within a content-based network is disclosed. In one embodiment, the CPE comprises: a processor; at least one software process operative to run on the processor; and at least one display interface. The at least one process is adapted to receive information relating to delayed delivery of content previously requested, and cause display of a notification on an associated display device via the at least one display interface.

In one variant, the network comprises a cable television network, and the CPE comprises an OCAP (OpenCable) compliant set-top box having at least one tuner, demodulator, and middleware. The at least one process comprises a client application downloaded to the CPE over the cable network via the at least one tuner.

In another variant, the CPE comprises a secure microprocessor (SM), and content previously requested comprises a downloadable conditional access (DCAS) module or image.

In a sixth aspect of the invention, a method of providing contextually relevant advertising is disclosed. In one embodiment, the method comprises: receiving a request for content delivery, the content having at least one context; determining that insufficient network capacity exists to service the request immediately; and generating a notification to a requesting entity indicating that delivery of the content will be delayed. The notification comprises at least one advertising element that is related to the content via at least the context.

In one variant, the context is determined at least in part via metadata associated with the content, and the advertising element comprises at least one graphical or audible element shown or played when the notification is presented.

In another variant, the advertising element relates to second content that is related or similar in nature to the requested content.

In a seventh aspect of the invention, a method of delivering requested content via a delayed delivery mechanism in a content-based network is disclosed. In one embodiment, the method comprises: determining that the requested content cannot be delivered immediately because of capacity or bandwidth shortage; storing, on a storage device remote from the subscriber's location, at least a portion of the requested content for later delivery to the subscriber's location; and providing a notification of the delay of the delivery of the requested content to the subscriber.

In one variant, the storage device is located at a network location selected from the group comprising: (i) headend; (ii) distribution hub, and (iii) BSA switching node, and the method further comprises retrieving the at least portion of the requested content from the storage device when the shortage. Delivery of the retrieved content can be provided via, e.g., an opportunistic or trickle download mode, or via a time-sensitive streaming mode.

In another variant, the requested content is ephemeral in nature and not otherwise stored on the network.

In still another variant, the storage device comprises a finite amount of storage, and when not enough unused space is available in the storage device to store the requested content in its entirety, a first-in-first-out (FIFO) approach is used to store the at least portion of the content.

In yet another variant, the requested content is trickle downloaded to the subscriber while it still being stored on the storage device.

In yet another variant, the storage device is limited in the duration of time that the at least portion of the content can be stored.

In an eighth aspect of the invention, a method of notifying subscribers within a content-based network of the availability of new or previously unavailable content is disclosed. In one embodiment, the method comprises: providing a first notification of an impending availability for the content; substantially in response to the act of providing, receiving a request for notification of the availability of the content from a subscriber; determining that the content is available; and providing the notification of availability to the subscriber substantially in response to the determining.

In a ninth aspect of the invention, network server apparatus for use in a content-based network is disclosed. In one embodiment, the server apparatus is adapted to process requests for content delivery, and comprises: a processor; a communications interface in operative communication with the processor and the network, the interface being adapted to receive the requests; and a software process operative to run on the processor. The software process is adapted to: receive a request for content from a client device in operative communication with the network via the interface; evaluate the network's capacity to fulfill the request substantially in real time; determine, where the capacity is not available, a delayed delivery mode to be used to deliver the content; and provide a notification to at least the client device relating to the non-availability and the delayed delivery mode.

BRIEF DESCRIPTION OF THE DRAWINGS

FIG. 2 is a logical flow diagram illustrating one exemplary embodiment of the method of operating a content-based network using capacity detection and notification according to the present invention.

FIG. 3d is a graphical illustration showing typical bandwidth requirements for various exemplary program streams (in Mbps).

FIG. 4 is a logical flowchart showing an exemplary embodiment of the method for estimating the completion time of delivery via download, such as via a programmatic trickle download.

FIG. 4a is a flowchart of an exemplary embodiment of the method for estimating when content delivered by streaming may be available.

DETAILED DESCRIPTION OF THE INVENTION

Figure 1:
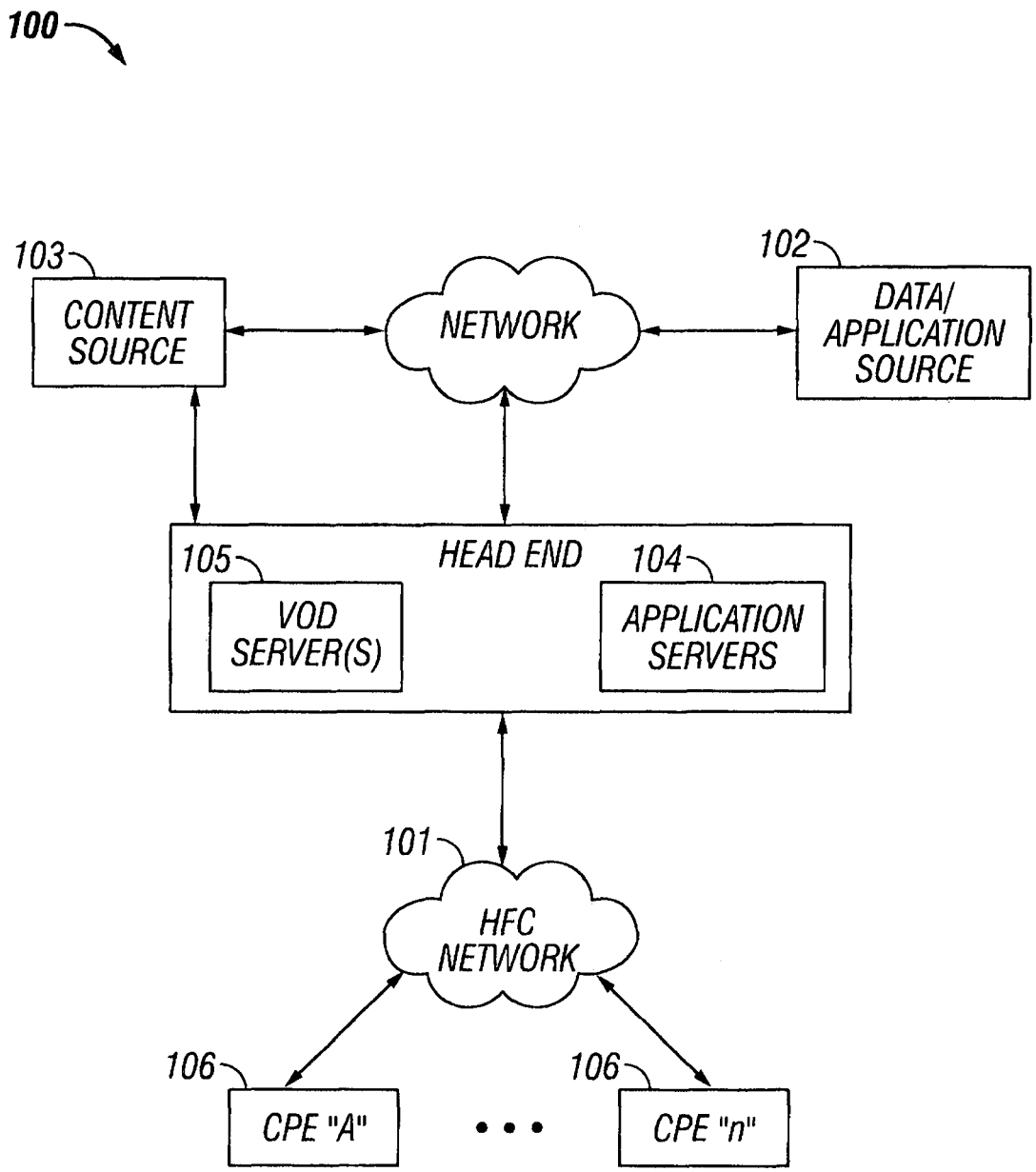
FIG. 1 is a functional block diagram illustrating an exemplary HFC cable network configuration useful with the present invention.

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "display element" refers to any user interface (UI) or other structure adapted to be displayed on a display device including without limitation windows, icons, objects, "tickers" or menus.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16 QAM, 64 QAM, 256 QAM, etc.) depending on details of a cable network. A QAM may also refer to a physical channel modulated according to said schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "server" refers to any computerized component, system or entity regardless of form which is adapted to provide data, files, applications, content, or other services to one or more other devices or entities on a computer network.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may programmatic (e.g., predetermined to continue in one session until complete, such as based on a bandwidth reservation), or may also be opportunistic; e.g., conducted in two or more segments as excess capacity becomes available.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides an efficient and useful solution for identifying and handling situations in which requested services require more bandwidth than is presently available on a network. This method can be used, for example, in a cable television or other content-based network in order to facilitate the management of content requests by subscribers via utilization of a real-time or delayed delivery notification mechanism. In one exemplary embodiment, content is requested by the subscriber during a time (or for a time) where the network capacity or bandwidth available for delivery of that content is limited, and a notification is accordingly sent to the subscriber to alert them of a potential unavailability of requested content. The subscriber may be offered the choice to either cancel the request or to accept delayed delivery of the requested content, for example.

Numerous variants on this basic scenario are also disclosed, including inter alia: (i) providing the subscriber with a projected delivery or availability time for the requested content (either via the requesting modality; e.g., set-top box and cable network interface, or via another communication channel); (ii) allowing the subscriber to specify a date and/or time of delivery, such as one convenient to them; (iii) providing the subscriber with a "content ready" notification when the content is actually ready for delivery; (iv) automatically programming or operating the subscriber's CPE or connected devices based on projected or actual delivery information.

In another variant, the subscriber is provided with the opportunity to "trickle" download the content (which may in certain cases be at an unpredictable rate, and/or be completed at an unpredictable time), or download at a time solely determined by the network operator, in exchange for, e.g., a discount or other such consideration. This approach allows the network operator an added degree of control and flexibility in managing network bandwidth, since such requests can be serviced opportunistically.

The present invention also provides a mechanism for the detection of network capacity (e.g., downstream bandwidth), as well as shortfalls associated therewith based on actual or projected demand. Such projections can be made based on, e.g., historical bandwidth usage, probabilistic or other speculation, or other such mechanisms. This mechanism may be used with the notification apparatus and methods described herein, or alternatively for other purposes.

Embodiments of the present invention also allow for real-time (streaming) or delayed delivery of content to a specified playback or storage device that is independent of the subscribers request location.

In yet another aspect, the content availability and notification apparatus and methods of the invention can be used for notification of subscribers or other parties of the availability of new content (e.g., recently released video, games, etc.), irrespective of network capacity considerations.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Network

FIG. 1 illustrates a typical content-based network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
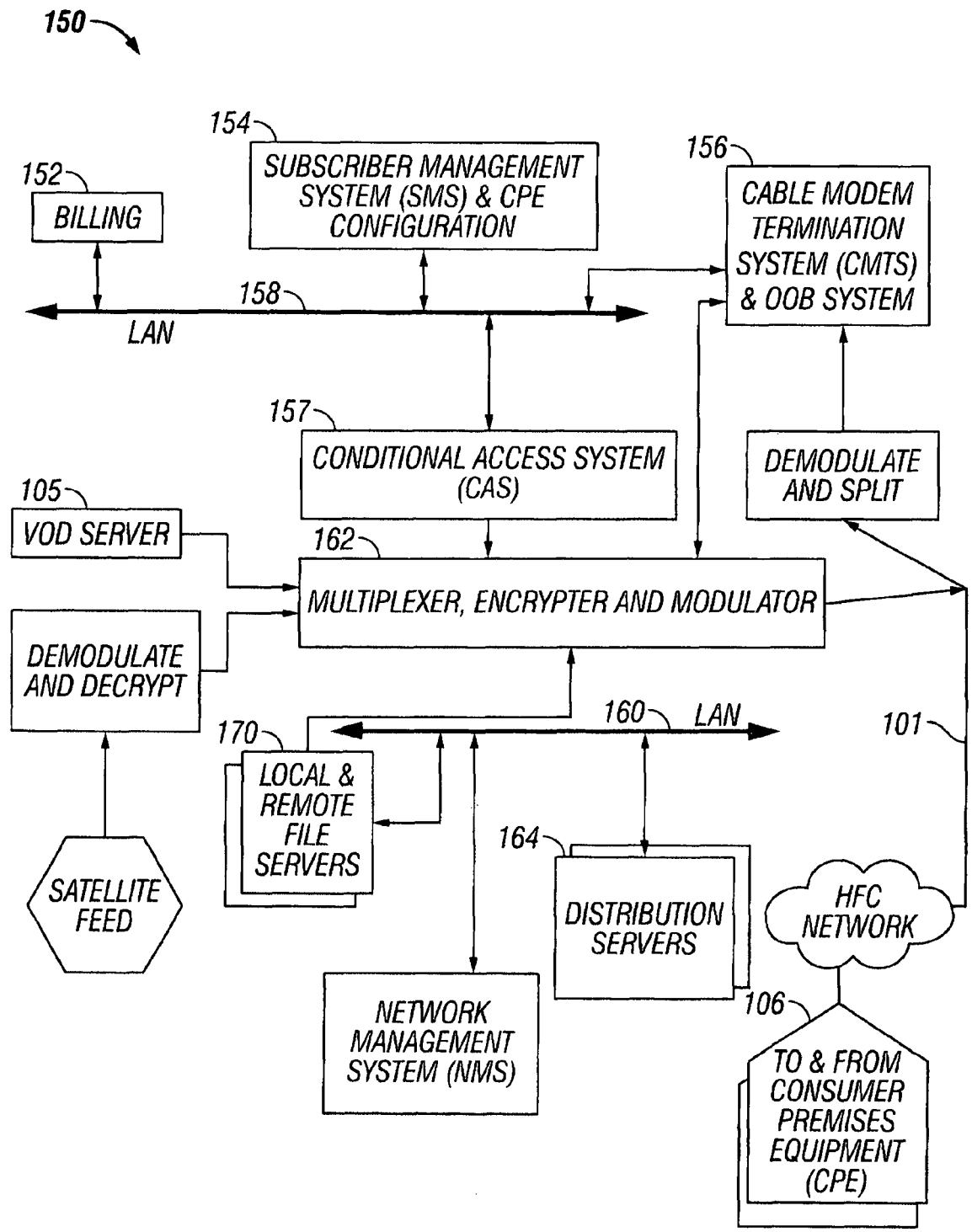
FIG. 1a is a functional block diagram illustrating one exemplary HFC cable network headend configuration useful with the present invention.
Figure 1B:
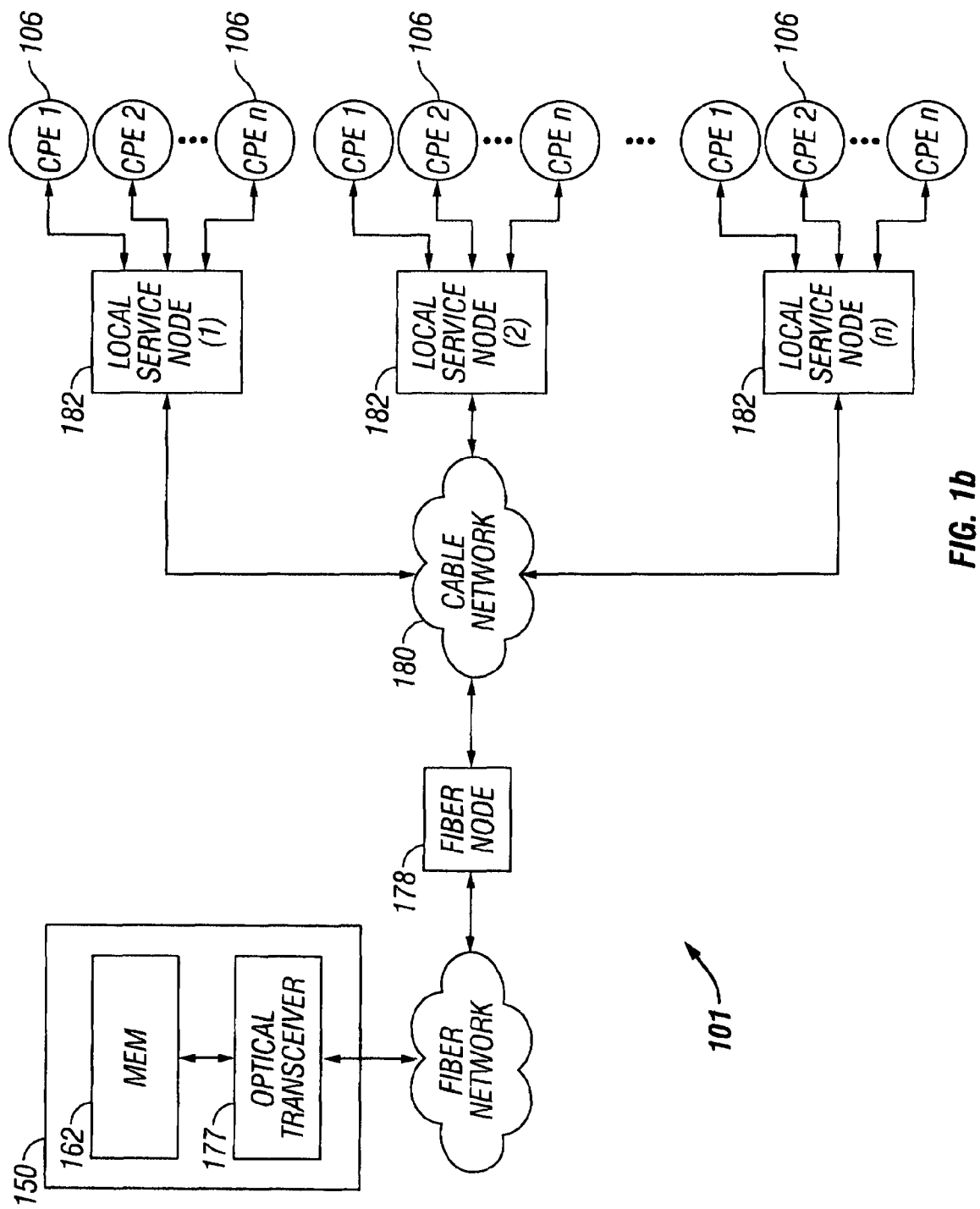
FIG. 1b is a functional block diagram illustrating one exemplary local service node configuration useful with the present invention.

Referring now to FIG. 1*a*, one exemplary embodiment of a headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1*a* is high-level, conceptual architecture and that each MSO may have multiple headends deployed using custom architectures.

The architecture 150 of FIG. 1*a* further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

Figure 1C:
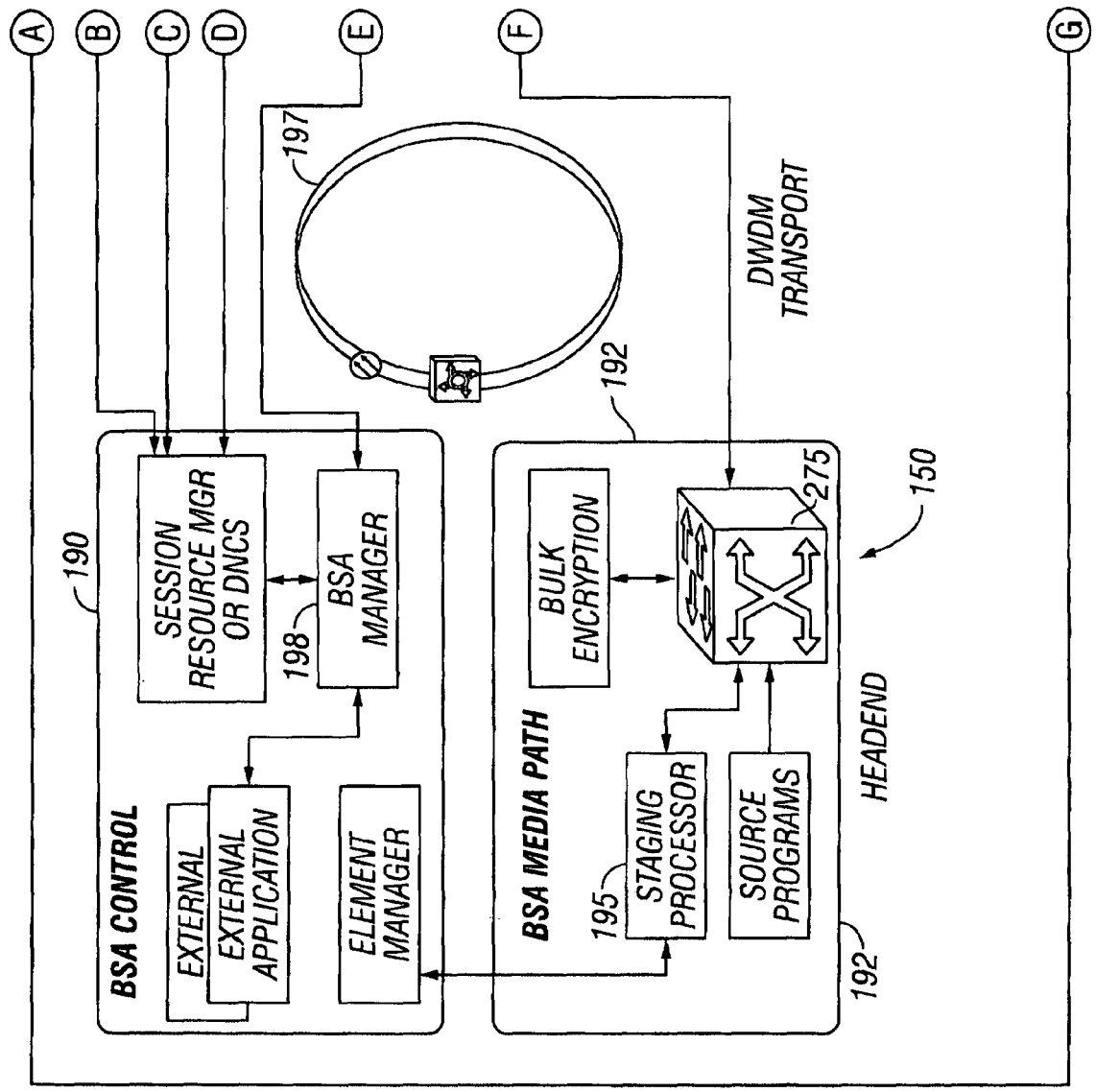
FIG. 1c is a functional block diagram illustrating one exemplary broadcast switched architecture (BSA) network useful with the present invention.
Figure 1C:
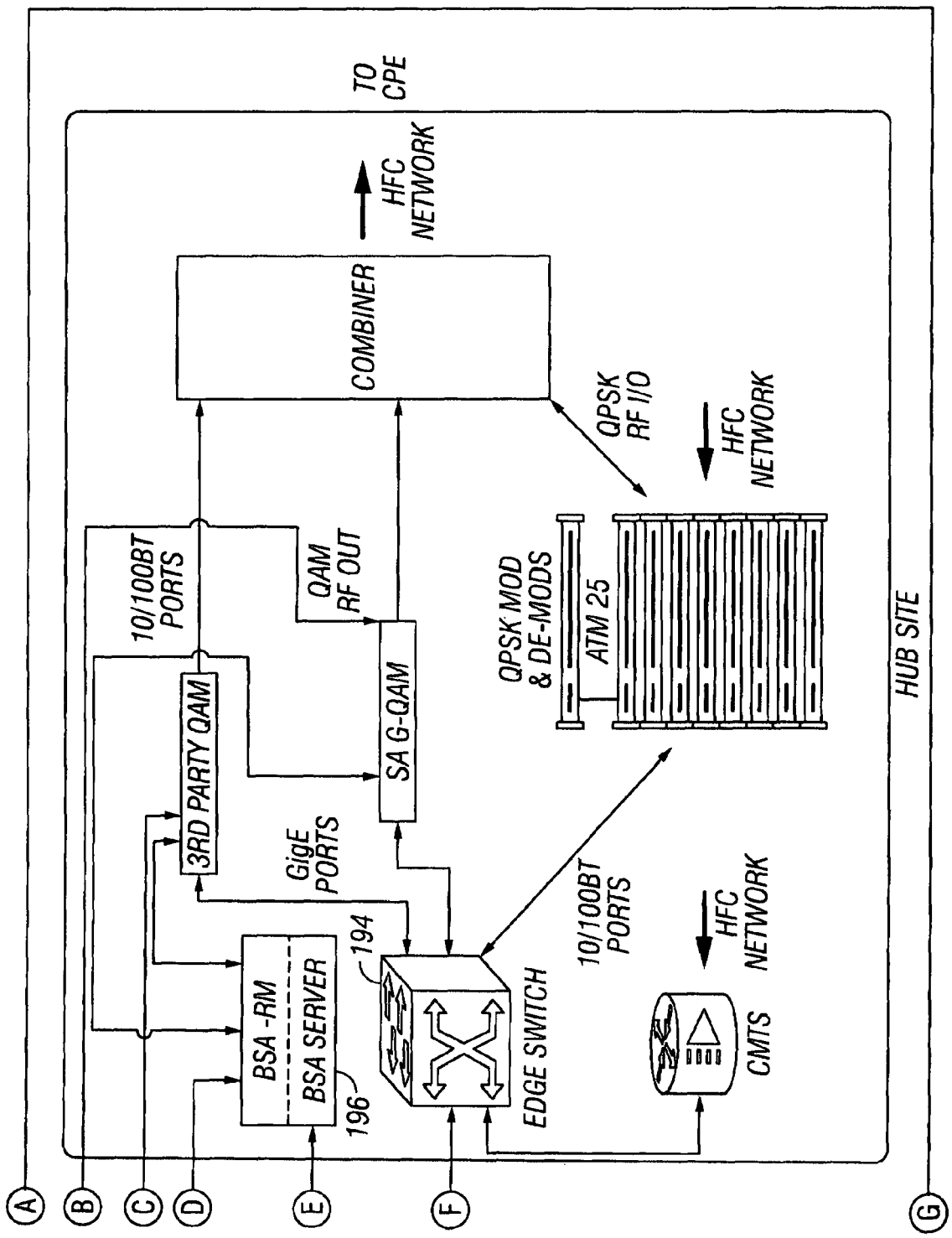

FIG. 1*c* illustrates an exemplary "switched" network architecture also useful with the determination and notification features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a* and 1*c* also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Methods

Figure 2A:
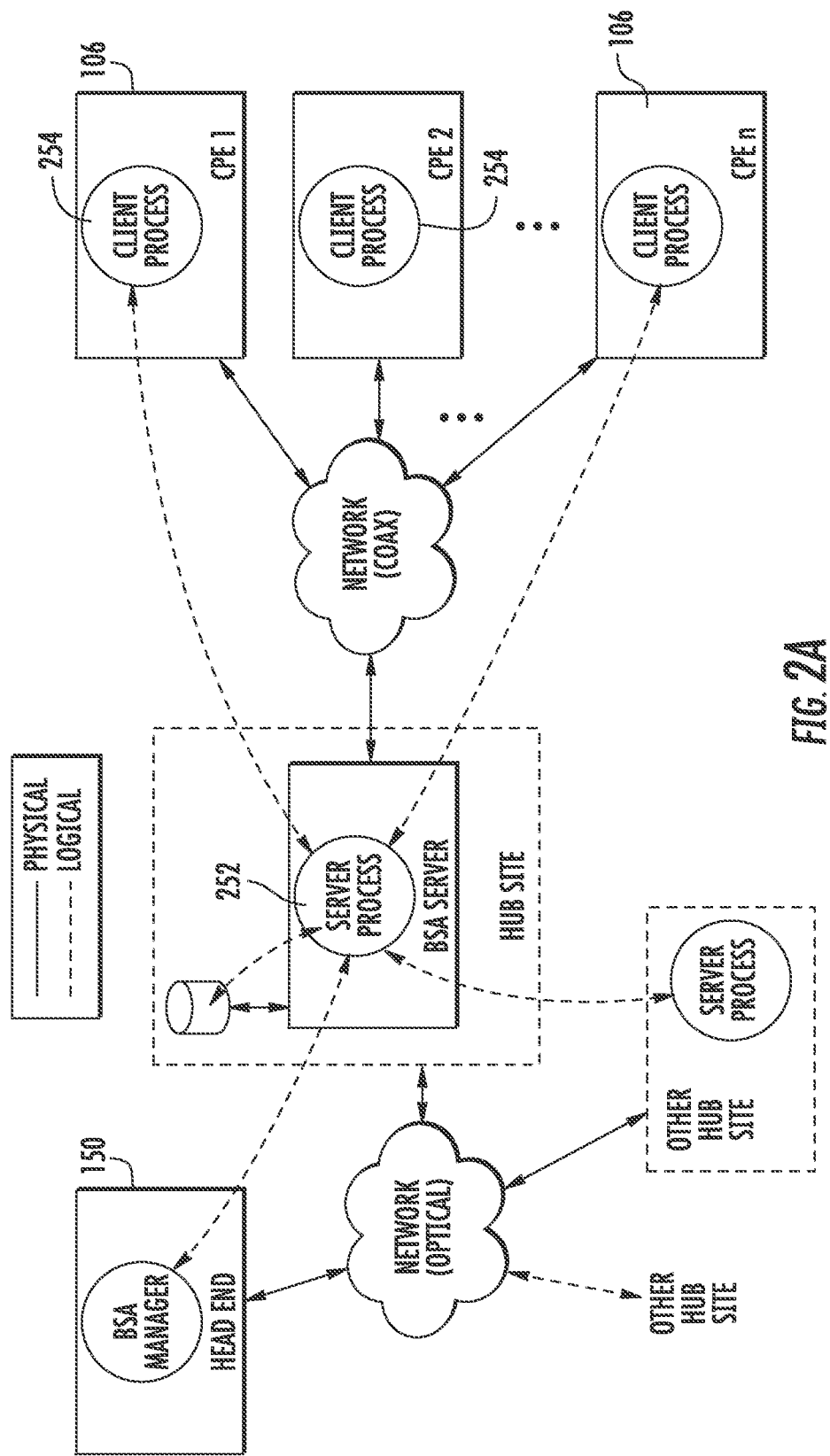
FIG. 2a is a graphical representation of an exemplary hardware/software architecture implementing the functionality of the invention.

Referring now to FIGS. 2-2a, one exemplary embodiment of the method of operating a content-based network using delay notification according to the present invention is now described.

As shown in FIG. 2, the method 200 comprises first disposing a server process 252 on a server within the network (step 202). In the exemplary embodiment, this server comprises the BSA server 196 disposed at the hub site (see FIG. 1c), although it will be recognized that the selected server may literally comprise any server or device in communication with the BSA server (such as, e.g., a VOD server 105, content server 103, application server 104, third party proxy server, and so forth), or even multiple ones of the foregoing.

Per step 204, a corresponding client process 254 is optionally disposed on one or more of the CPE 106 of the network. It will be appreciated that while described in the context of a client process 254 in the present embodiment, aspects of the invention may be practiced equally well without a client process; e.g., the notification functions described subsequently herein can be issued entirely from a server or other process 252. This is especially true in light of embodiments where notification is provided via channels other than the MSO network (e.g., a cellular call or text message), and no CPE 106 per se may be involved. However: (i) a client process 254 may be used on the alternate device to which notification is being sent (e.g., a PC, cellular telephone, PDA, etc.); and (ii) the CPE-based client process described herein may be used in conjunction with these alternate notification modes (i.e., to provide various functions to be performed consistent with the delayed receipt of the content at the CPE 106, irrespective of the notification mode). Hence, the term "client process" as used herein is broadly construed to relate to devices or entities other the CPE as well.

The client and server processes or entities 254, 252 may comprise independent stand-alone applications, or alternatively parts of a distributed application (DA) of the type well known in the programming arts (see FIG. 2a). Intrinsic in this step 204 is installation of the client process on CPE that is in direct or indirect communication with the server process 252, since the two (or more) entities need to remain in at least intermittent communication with one another so that, e.g., notifications can be sent from the server to the client, and optional data gathered by the client process 254 (e.g., CPE profiling data, historical use data, etc.) can be forwarded to the server process 252. Accordingly, one or more application programming interfaces (APIs) are also provided within each process application to allow for, inter alia, communication with the other 25 entity, communication with other remote processes, communication with the network operators (such as via a GUI), and so forth. The structure and implementation of distributed applications and APIs are well known in the programming arts, and accordingly not described further herein.

The client process application (where used) can be provided to the CPE 106 using any number of different methods including, for example, download via in-band downstream channel (e.g., pulled of a file carousel), via DOCSIS modem, via downstream OOB channel, during a maintenance or upgrade service call (e.g., by a technician with the application stored on a medium such as USB key or CD-ROM), via mailed medium (e.g., CD-ROM mailed to the subscriber and installed thereby), and so forth. The client application 254 may also be installed at time of manufacture of the CPE 106, and loaded at boot-up. Moreover, the client process may be installed (and even subsequently destroyed or removed) on an as-needed basis; e.g., only when the subscriber requests the content, and there is a delay in delivery necessitating notification.

Next, per step 206, the server process 252 is initiated and receives programming inputs from the MSO or network operator as to the desired configuration. These inputs may be manually entered by the MSO/operator, or alternatively be drawn from one or more custom configuration files, each file for example providing a different set of configuration parameters that are optimized for different operating and notification scenarios.

Per step 208, the server process 252 optionally generates a "rules" file for the CPE 106 which will dictate how the CPE client process 254 will operate to process and provide notification to the subscriber, collect data for the server process, and so forth (as applicable). In this regard, the client process 254 of the illustrated embodiment acts as the server process' proxy, in effect being a slave to the rules set forth by the server process 252. However, it will be recognized that the present invention may also be configured such that the client process 254 has varying levels of innate intelligence as well as configurability by the subscriber themselves, thereby allowing it at least in some aspects to determine its own operational parameters, or even dictate rules to the server process (e.g., based on user inputs to the CPE as to their notification preferences).

In generating the rules file, the server process 252 of the exemplary embodiment allows the network operator (e.g., MSO) to build a customized policy (which may be based on subscriber inputs) for how the corresponding client process 254 on the CPE 106 operates. For example, the MSO can specify: (i) type and content of notification provided (visual, audible, etc.), and conditions by which it is presented (e.g., only on startup, immediately upon receipt, etc.); (ii) where to store the requested content on the CPE or connected devices (if applicable); (iii) program channel or tuner coordinates where the delivery will take place, (iv) circumstances and types of data to collect regarding CPE profile, subscriber historical data, (v) where/when to send subscriber notification configuration inputs, etc., as applicable. Other directives or policies may be generated by the server process (alone or in conjunction with MSO operator inputs) to form the rules file sent to the client(s) 254.

Similarly, if so enabled, the client process 254 can generate notification rules or data (based on subscriber inputs or preferences, data collected from the CPE regarding capabilities, subscriber habits, etc.), and transmit these rules to the server process 252, wherein they will be saved for subsequent implementation.

It is also noted that the configuration of the CPE 106 by way of the rules file may be subscriber/tuner-specific using, e.g., the anonymous subscriber identification methods and apparatus described in co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety. Accordingly, the MSO (or server process 252 itself) can configure individual CPE 106 according to tuner-specific activity analysis gleaned from that particular CPE.

Per step 210, the server process 252 next transmits the rules file/message to the CPE (via any of the aforementioned communication channels) whereby it is received, stored (e.g., such as a policy table or other data structure), and ultimately read by the client process 254. This transmission may comprise transmitting via a packetized protocol existing within the system for downstream communications, such as MPEG2, DSM-CC, or any other mechanism suitable for the task.

Per step 212, the client process 254 reads the rules file/policy table and then (whether immediately or with some latency as dictated by the rules file) implements the relevant notification and optional data collection rules. In the exemplary embodiment, profiling data regarding the CPE 106 hardware or software configuration may be gathered up and sent upstream, such as at startup. The methods and apparatus of U.S. Patent Application Publication No. 20020032754 to Logston, et al. published Mar. 14, 2002 entitled "METHOD AND APPARATUS FOR PROFILING IN A DISTRIBUTED APPLICATION ENVIRONMENT", incorporated herein by reference in its entirety, can be used for such a purpose, although other approaches may be used as well. As described subsequently herein, such profiling information may be useful in allowing the server process(es) ("notification engine") to match requests with bandwidth opportunities occurring subsequently within the network, available delivery modes, etc.

Figure 3:
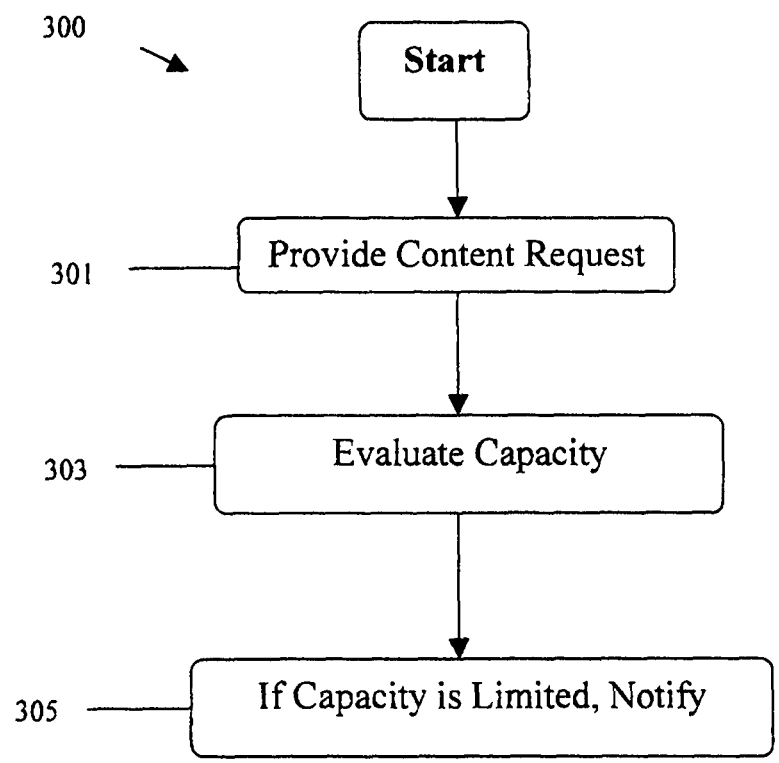
FIG. 3 is a logical flowchart illustrating one exemplary embodiment of the generalized method of implementing a notification capability within a network according to the invention.

FIG. 3 illustrates one exemplary embodiment of the generalized method of implementing a notification capability within a network according to the invention. As shown in FIG. 3, the method 300 comprises first providing a request for content per step 301 (e.g. a request for HD service, SD service, or Video on Demand, etc). Next, the network capacity or availability (e.g., bandwidth, and/or other metrics of network capability) is evaluated per step 303 to determine if the content can be delivered. As is well known, bandwidth management techniques are utilized to efficiently manage the bandwidth allocation on a network and provide the most efficient use of bandwidth available to service a plurality of requests simultaneously. However, as discussed in greater detail subsequently herein, the implementation of such bandwidth management (and allocation) techniques can be considered and even adjusted as part of the methodology 300 disclosed herein, such as where certain requests (or types of requests) can be prioritized within the bandwidth allocation algorithms (e.g., to prioritize servicing VOD or other requests from "premium" subscribers).

It should be noted that just because the available bandwidth is not sufficient to fulfill a subscriber's request for content or service, it does not mean that absolutely no bandwidth is available for transmitting information to the subscriber. It may just mean that the available bandwidth is not enough for reliable, real-time delivery of service.

Next, per step 305, if it is determined that the capability is limited due to bandwidth unavailability or other factors, then a notification service is initiated.

Figure 3A:
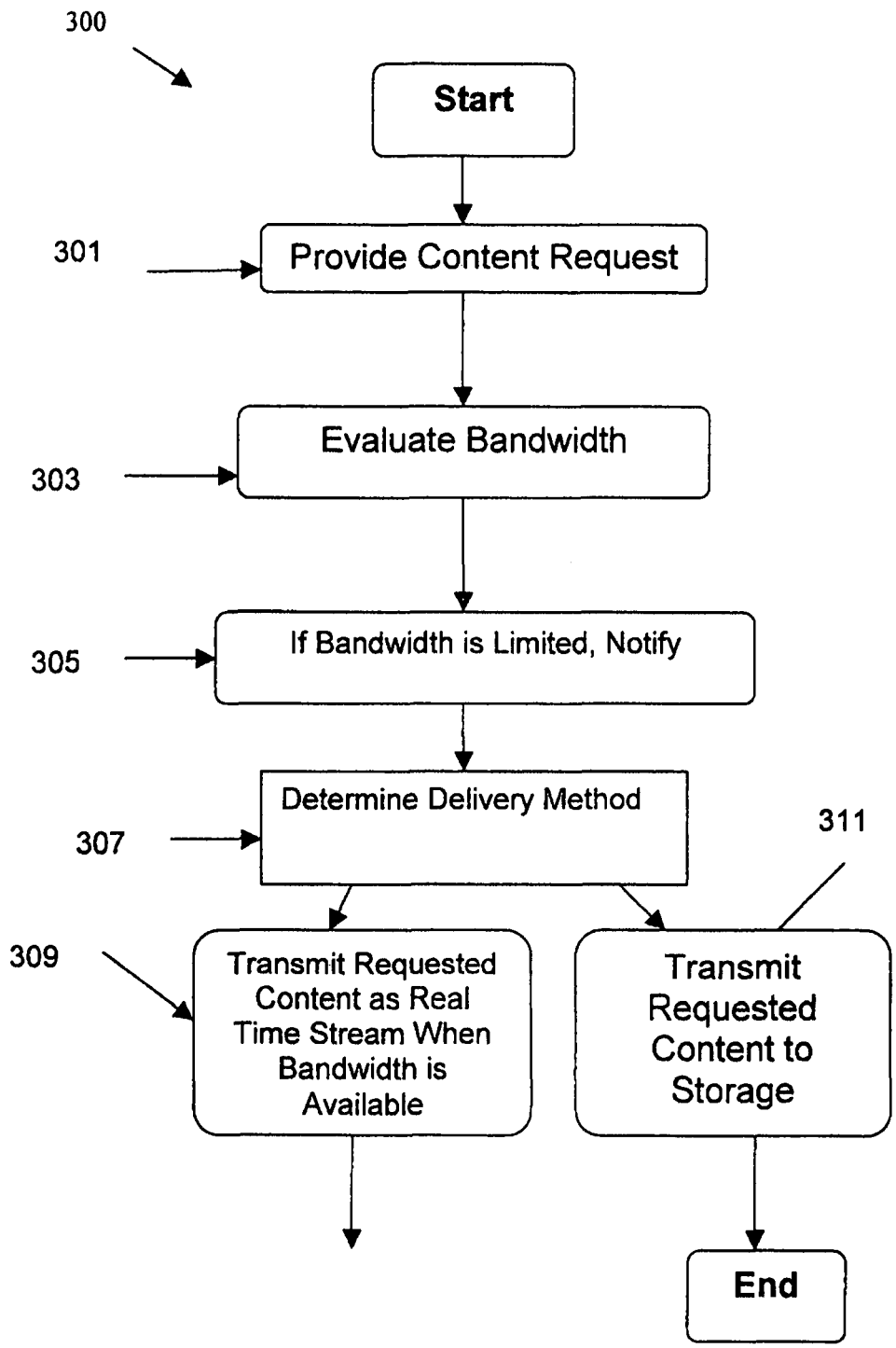
FIG. 3a is a logical flowchart illustrating one exemplary implementation of the methodology of FIG. 3.

FIG. 3a illustrates one exemplary implementation of the methodology of FIG. 3. As shown in FIG. 3a, if the capacity or bandwidth is limited and a notification is sent per step 305, at least one transmission method is subsequently determined selected per step 307 for when content is available for transmission. For example, in a broadcast or streaming paradigm, and/or where a subscriber has no DVR, a "real time" stream mode would be used. Alternatively, for a gaming application, file, or storage to the subscriber's DVR, a "storage" mode could be selected.

It will be recognized that in order to service a streaming request, sufficient bandwidth (within the latency and buffering limitations of the system) must be available throughout delivery, so as to avoid chopping up or segmenting delivery of the content to the subscriber (e.g., a movie which stops and starts), which can cause significant user frustration. Hence, for such time-sensitive content, not only is instantaneous bandwidth or capacity important, but available bandwidth or capacity for the duration of the streaming event is as well. Detection of capacity or bandwidth for such streaming applications can be accomplished in many ways. For example, one may evaluate actual or existing bandwidth allocations (e.g., to program streams, etc. being currently delivered), predicted or speculated bandwidth usage on the network (e.g., by way of historic, anecdotal, or algorithmic modeling), actual or estimated bandwidth requirements of the current request, or combinations thereof. Further discussion of capacity detection, prediction, and related topics is provided subsequently herein.

In contrast, for a download paradigm (e.g., non-time sensitive content), the download is typically completely transparent to the subscriber (e.g., conducted in the background during other viewing, or during non-viewing times), and hence stops and starts in the download are irrelevant. Accordingly, the download paradigm offers the MSO significantly greater flexibility in delivery, as described subsequently herein.

If streaming or "real time" transmission is selected (step 309), then the content is delivered via a stream when the capacity becomes available (assuming all other criteria or preconditions are met). However, if transmission is selected for transmission to storage (step 311), then content is delivered to a storage medium. This latter storage or download mode may be burst download (see, e.g., co-owned and co-pending U.S. patent application Ser. No. 11/013,665, filed Dec. 15, 2004 and entitled "METHOD AND APPARATUS FOR HIGH BANDWIDTH DATA TRANSMISSION IN CONTENT-BASED NETWORKS", incorporated herein by reference in its entirety, which describes one exemplary architecture and method for using VOD or other session-based network infrastructure for high-speed downloads of data, files, and content), or any other mode including a "trickle" download or opportunistic delivery. See, e.g., co-owned and co-pending U.S. patent application Ser. No. 11/291,328, filed Nov. 30, 2005 and entitled "Apparatus And Methods For Utilizing Variable Rate Program Streams In A Network", incorporated herein by reference in its entirety, which describes one exemplary mechanism for inserting secondary (e.g., non-time sensitive) content or information into a program stream on an opportunistic basis using transient or "residual" bandwidth. This approach can be applied to the present context for purposes of downloading the content that cannot otherwise be supported by the (primary) available capacity e.g., bandwidth.

Residual and opportunistically available bandwidth may come from several sources. One source is the unallocated bandwidth on an MPEG-2 transport stream. Another source is the bandwidth is allocated to, but unused by, the services on the transport stream.

In digital video, such as MPEG-2, video the bit rate of an encoded video service may be variable or "constant". In a variable bit rate service, the instantaneous bandwidth requirement may vary over time.

Even with constant bit rate services, the actual bandwidth may at times be below the nominal bit rate. It is common for MPEG-2 encoders to "pad" a stream by inserting null packets (PID 0x1FFF), thereby maintaining (approximately) the nominal bit rate.

Unused bandwidth capacity, such as the null packets in an MPEG-2 stream, can be reclaimed for use in the above delayed delivery method.

Accordingly, the present invention is advantageously adaptable to both streaming delivery and download (non-streaming) paradigms, and hence provides the network operator and the subscriber with substantial flexibility regarding implementation of request, notification and delivery functions. For example, the download mode is used in one variant as a fallback or alternative mode when a subscriber cannot immediately obtain a stream delivery. A GUI or other user interface can be used to notify the subscriber of the impending delay under the streaming mode, and then allow them to inter alia: (i) accept later streaming delivery, the time determined by the MSO; (ii) accept a later download (whether via high-speed, trickle or opportunistic modes); or (iii) schedule a streamed or download delivery at a time of their choosing (that is within the projected MSO availability window).

It will also be appreciated that the transmitted content (e.g., video, audio, data files, games, etc.) can be checked for errors before, during or after the streaming or download process. For example, in one variant, the CPE 106 includes a software routine to "crawl" ahead of the streamed content (i.e., before playback) and check for errors, such as via a CRC, Reed-Solomon, FEC, or other such well known approach. In the event that an error is detected (e.g., corrupted and unrecoverable packets), a retransmission from the source can be effected.

Figure 3B:
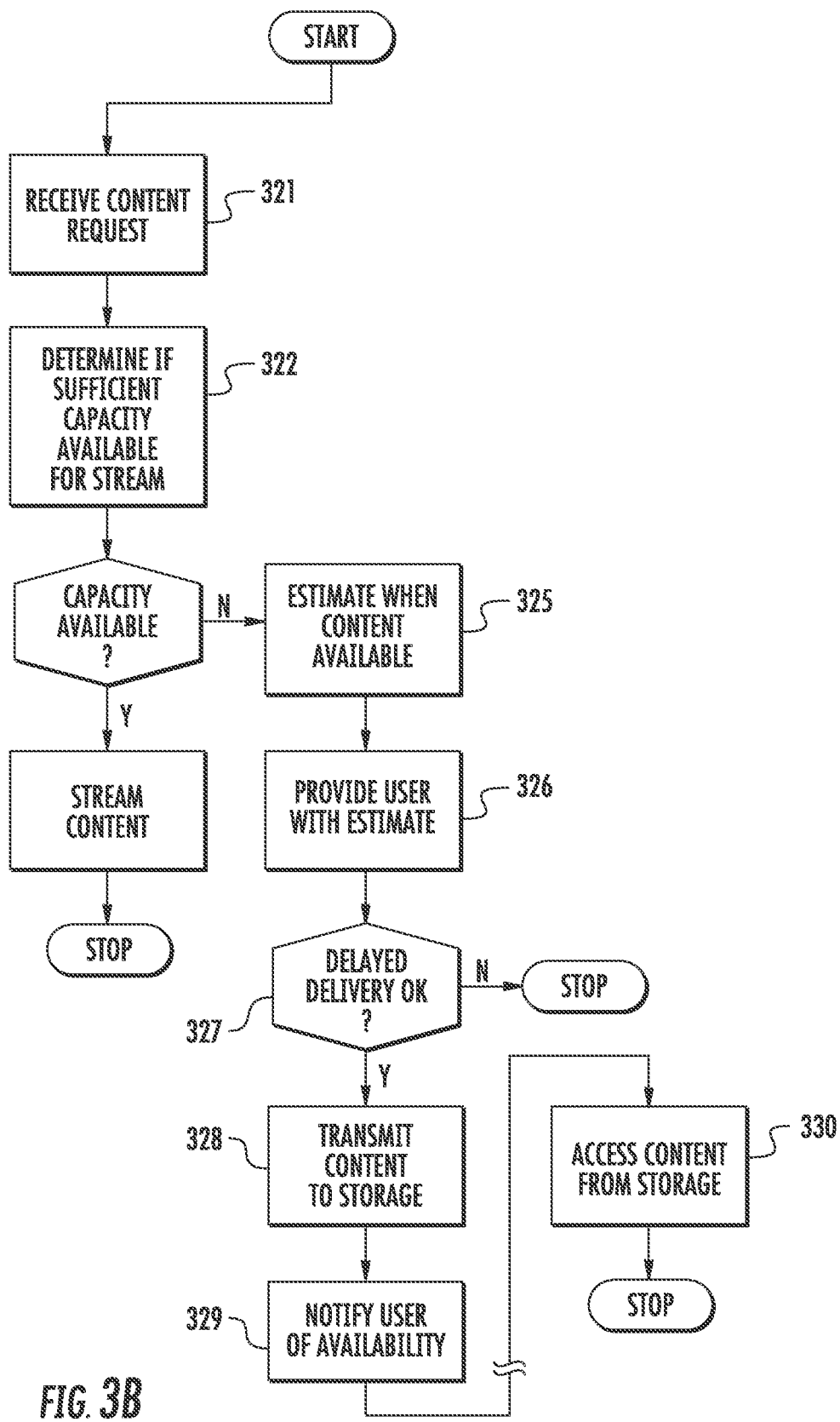
FIG. 3b is a flowchart that depicts a method according to the present invention utilizing a storage of content approach.

FIG. 3*b* is a flowchart that depicts a method according to the present invention utilizing storage of content approach (i.e., where sufficient capacity does not exist to service the request in streamed delivery mode, or where the content is not time-sensitive).

As shown in FIG. 3*b*, the exemplary method comprises first receiving a request for content 321. Content can be requested in a variety of ways including without limitation via an upstream communication from a CPE 106 to a server 105 (e.g., a subscriber interacting with an on-screen GUI, EPG or the like to request content), via a PC or other device in data communication with the distribution network (such as via a DOCSIS channel), via an e-mail sent via e.g., TCP/IP channel, text or SMS message, via a mobile device via a wireless (WSP) or cellular (CSP) network, via a PSTN phone call, etc.). Note that the delivery, mode or channel may be different than the requesting mode or channel as well, such as where a subscriber can utilize their mobile device to access an IP address or URL for a server, which then communicates with a VOD or other delivery server to instantiate a download or streaming of content after the evaluation of network capacity has been conducted.

Moreover, the requested content may be delivered to a storage device remote from the subscriber's location (i.e., the location of their CPE), which may also be different or remote from the requesting location.

Next, the network system determines if capacity (e.g., bandwidth) is available for streaming delivery 322 and if so, then the content is delivered immediately (e.g., streamed in real-time. Otherwise, if it is determined that the bandwidth is not available to transmit the requested content, then network capacity determination (and optionally management) techniques are utilized, and an estimated time for when the content will be available is determined per step 325, and this information is provided to the subscriber per step 326. Next, the subscriber may cancel the request, or accept delayed delivery of requested content per step 327. If the subscriber accepts delayed delivery, then the content is later transmitted and stored; e.g., to a storage medium per step 328. As previously noted, the requested content may be delivered using high-speed download, trickle, and/or residual or opportunistically available bandwidth to a storage device that the subscriber has elected (e.g., DVR on their DSTB).

The subscribers receiving device (e.g., CPE 106) may also be considered as a factor in estimating the time it will take to complete content download. For instance, if the subscribers' receiving device has more than one tuner, then the subscriber may receive a trickle or other download using one tuner, and programming on the same or a different transport stream using another tuner. Similarly, a DOCSIS tuner in communication with the storage device can be used to receive the download in certain cases (e.g., via a TCP/IP transport channel via the DOCSIS downstream). However, if the subscriber has only one tuner, he/she can receive at most one transport stream at one time. Should a resource conflict occur internal to the receiving device, it may be handled in a variety of ways including for instance by refusing a requested channel switch until the contention is relieved or otherwise resolved. Alternatively, the receiving device may comply with the channel switch requested, and abort the in-progress trickle or other download. As yet another alternative, the receiving device may comply with the channel switch request, and suspend in-progress trickle or other download. The suspended trickle download may resume, for example, when the subscriber later switches back to a channel/service on the transport stream on which the suspended trickle download was taking place. The suspended trickle download may also resume when the subscriber later turns the receiving device into a "standby" mode.

In yet another embodiment, the receiving device may inform the subscriber of the resource conflict and allow the subscriber to choose between the previously-mentioned alternatives.

In still another embodiment, the network system may attempt to transfer the trickle download from the previous transport stream to the new transport stream to which the subscriber's receiving device is switching. The attempted transfer may or may not be successful, depending on whether the new transport stream has bandwidth to accommodate the (transferred) download. In the event of an unsuccessful transfer, the in-progress trickle download can be aborted or suspended, as previously described.

Moreover, the management of content storage can be implemented in a variety of ways, such as using a finite or deterministic amount of storage capacity for storing content for later delivery. The usage of storage can also be limited by limiting the duration the content is stored, or the duration over which the requested content is trickled down while being stored remotely.

After download of content is complete, the subscriber is notified of the requested content as being available per step 329. The notification of the requested content is in the exemplary embodiment transmitted to the CPE 106 of the subscriber, such as via downstream signalling (in-band or OOB), or a message according to an existing network protocol. A process running on the CPE 106 may also be used to generate a notification indigenously, such as based on metadata or other information entrained or accompanying the downloaded content (e.g., relating to size, name, type, format, etc.), thereby obviating a separate downstream communication.

The notification may also be delivered to the subscriber by other means such as e-mail, text messaging, instant or SMS messaging, WAP push, page, or by telephone call (cellular, PSTN). Also, the notification message may comprise an audio alert, text alert, or graphics alert, or any combination thereof.

The subscriber then has the capability to play the requested content from storage per step 330 at their convenience. Playback or other access (e.g., copying) may also be tied to acknowledgement of the notification, such as in the case where the notification acts as a copyright notice or license, the terms of which the subscriber must assent to before the content can be accessed.

It will be recognized that although the availability of residual and opportunistically available bandwidth may vary over time, and possibly unpredictably, the delayed delivery method described herein does not depend on the guaranteed availability of such bandwidth, especially since: (i) the content is by nature not time-sensitive, and hence reliability against interruptions is not an issue; and (ii) other modalities for download may exist, such as the aforementioned high-speed session-based mode.

Figure 3C:
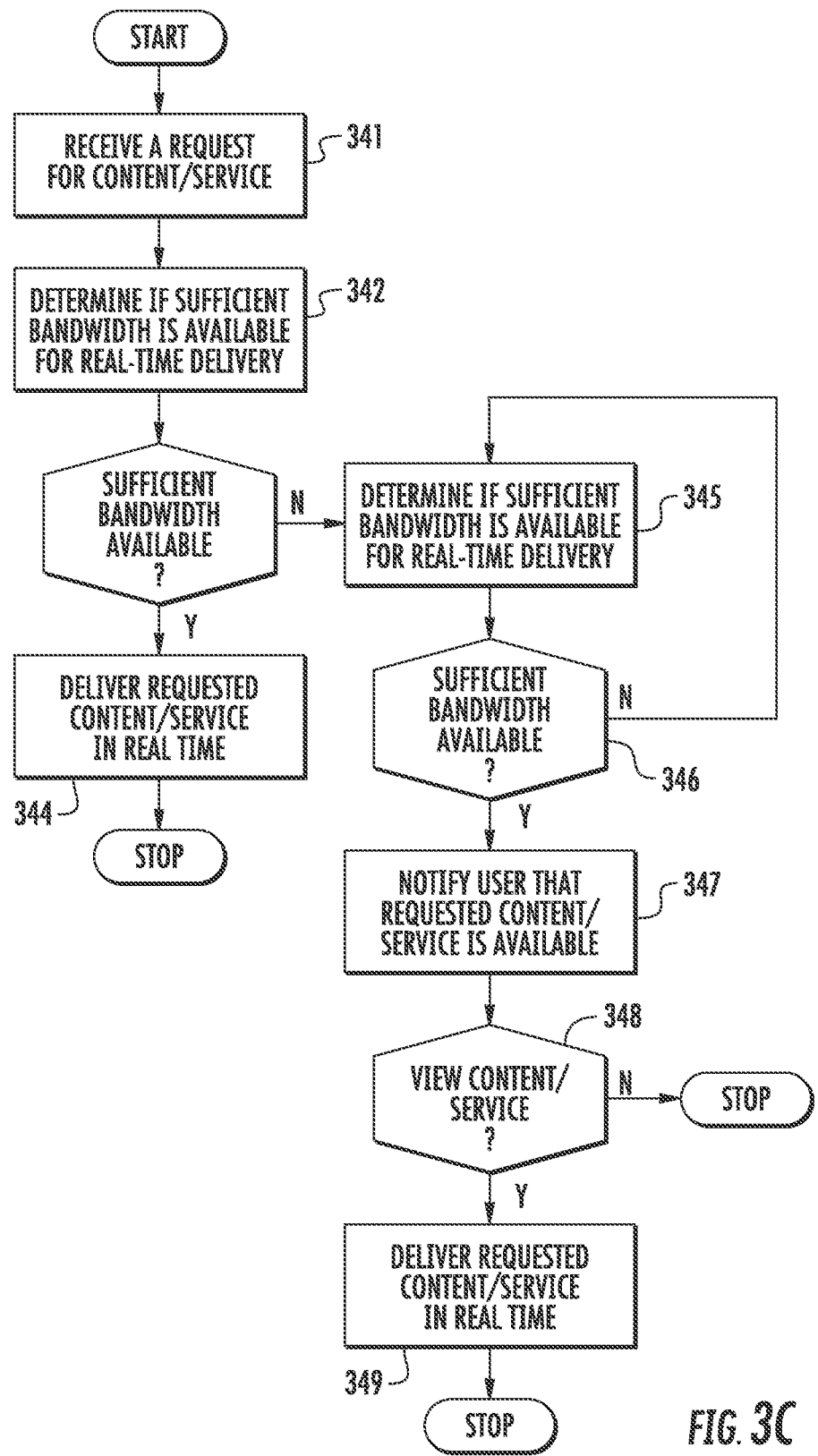
FIG. 3c is a flowchart that depicts an exemplary method according to a delayed stream-based delivery embodiment of the present invention.

FIG. 3*c* is a flowchart that depicts an exemplary method according to a delayed stream-based delivery embodiment of the present invention.

As shown in FIG. 3*c*, the method comprises first receiving a request for content per step 341. Next, the network system determines if the capacity (e.g., bandwidth) is available for immediate streamed delivery per step 342. If it is determined that the bandwidth is available, then the content is delivered immediately, in real-time per step 344. Otherwise, if it is determined that the capacity is not available to transmit the requested content, then the subscriber's request for content/service is stored or "remembered" per step 345. This storage may be based e.g., on a time index or clock, via a priority or queuing mechanism with other requests, or via association with an event. The availability of the requested content/service is then monitored (whether periodically, continuously, or anecdotally/non-systematically, based on one or more events) in the background per step 346. At a later time, when it is detected that the previously requested service/content and/or the capacity to deliver that content becomes available, the subscriber is notified per step 347, and offered the option per step 348 to view the service as a real time stream. If the subscriber selects to access the content/service, it is then delivered per step 349; otherwise the network system cancels the request to view (or stores it for later reminder or other such action).

FIG. 3*d* shows typical bandwidth requirements for various exemplary program streams (in Mbps).

In one illustrative application scenario of such streamed delivery embodiments, a subscriber requests (e.g., attempts to tune to) a broadcast service, e.g., BSA channel, but not enough bandwidth is available from the bandwidth then allocated to broadcast services. The subscriber is not specifically interested in the program being transmitted on the requested service at that time; the subscriber is rather interested in viewing whatever programming is being transmitted whenever that service is available. In this scenario, it is not necessary to store (for later re-transmission) the programming that the subscriber is unable to view. It is, however, advantageous to inform to subscriber when the requested service later becomes available. This is in contrast to, e.g., a VOD or PPV scenario, wherein the content is specifically requested, and hence must be delivered in its entirety.

In an exemplary embodiment, when the later availability of the previously requested service/content is detected, the detection mechanism will cause a notification message to be displayed on the subscriber's viewing screen, or other mechanism as described elsewhere herein. Such a notification may, for example, read "Channel XYZ is now available. Press SELECT to view, CANCEL to dismiss." Audible tones, modulating or flashing front panel or remote indications, or any number of other indicators may be used for this purposes as well.

In yet another embodiment, requested content that cannot be delivered immediately because of capacity or bandwidth shortage is stored for later delivery on a storage device remote from the subscriber's location. Such a storage device may be located at a central facility, such as the headend 150, but it may also be located elsewhere on the network, such as at a distribution hub, BSA switching node, etc. It may be even be physically outside the geographic area of the local cable system. In this embodiment, when the bandwidth shortfall that prevented immediate content delivery is no longer present, the previously requested content is retrieved from storage and delivered to the requester in the normal manner (whether as a stream, direct download, etc.).

This mode of delayed delivery is particularly applicable when the requested content is not already stored in the cable system, such as when the requested content is a broadcast or live program from a programming provider.

The management of content storage can be implemented in many ways. In one embodiment, a finite amount of storage is allocated for storing (buffering) content that cannot be delivered immediately. In this embodiment, if buffer storage is needed for delayed delivery but not enough unused space is available, the oldest buffered content not being delivered will be deleted to make room for the new request.

Alternatively, the usage of buffer storage can be limited by limiting the duration content is buffered. In one exemplary policy, content is buffered for a period of time (e.g., up to 24 hours) or for a prescribed number of events (e.g., so many accesses or downloads) for delayed delivery. At the expiration of the 24-hour period, any undelivered content is deleted and the storage space relinquished.

In yet another embodiment, the two previously described modes of delayed delivery are used in combination. In this embodiment, the requested content is trickle downloaded while it is still being stored (buffered) on a remote storage device.

As is in the case of the previous embodiment, this third mode of delayed delivery is particularly applicable to content not already stored in the cable system.

FIG. 4 shows a flowchart of an exemplary embodiment of the method for estimating the completion time of delivery via download, such as via a programmatic trickle download of the type previously described.

As shown in FIG. 4, the method comprises first determining the size of the data to be downloaded per step 401. This may also comprise an estimate. Next, the download start time is determined or estimated per step 402, based on e.g., the estimated completion time(s) of any prior uncompleted download(s), subscriber timing or preference requests, capacity or bandwidth constraints, and so forth. Next, a transport stream with unallocated and/or reclaimable bandwidth available at the estimated download start time is located per step 403. A determination or estimation of the amount of unallocated and reclaimable bandwidth available for the download can also be performed per step 404, or alternatively step 403 can be structured such that only transports having greater than a prescribed minimum amount of bandwidth available, or falling within an upper and lower bound, are identified.

Lastly, an estimate of the time to download requested content (and hence time of completion) is determined based on the estimated start time, data size and available bandwidth per step 405.

As can be appreciated, truly opportunistic downloads are less amenable to any sort of accurate estimation of duration or completion time, since they are by nature unpredictable and often transient.

FIG. 4a is a flowchart of an exemplary embodiment of the method for estimating when content delivered by streaming may be available.

As shown in FIG. 4a, the necessary bandwidth for the requested delivery is determined per step 452. See, e.g., FIG. 3d, which indicates maximum bit rates for various common program streams. As previously noted, these streams may be broadcast or ephemeral in nature, or session-based (e.g., a VOD session or PVR).

Next, other pending delayed requests that will need to be serviced using the network are identified per step 454. For example, there may be ten (10) outstanding requests with varying degrees of delay when the eleventh request is received; hence, the servicing of the prior ten requests must be considered in some fashion. As described subsequently herein, these prior requests need not necessarily be serviced in order, or even using the same delivery modality, and may also be for different content (and types of content; e.g., VOD, game download, BSA switch request, etc.)

An estimate of a future time when at least one transport stream will have sufficient unallocated bandwidth for transmitting the requested content, based on e.g., a predictive or other model, is next generated per step 456. For example, in one variant, historical data and current rate-of-change or other metrics of impending load can be used to generate a bandwidth availability profile. Hence as a simplistic example, if the aforementioned eleven requests (ten prior and current) will require 100 Mbps of bandwidth in the aggregate, and the predictive model indicates that 100+ Mbps will be available at time t=X, all eleven requests could be delayed until (and notified of) time t=X, at which point all could be serviced immediately. However, as will be recognized: (i) bandwidth that can be used to service one or more of the pending requests will likely be available before t=X, and/or (ii) more requests may be received between the receipt of the current (eleventh). request and t=X. Accordingly, the evaluation process of FIG. 4a is highly dynamic, and generally will be almost constantly re-evaluated to assure optimization or achievement of the desired goals. Moreover, once notification is issued to the requesting subscriber(s) (which often will be done with low latency in order to provide the subscriber immediate feedback on when their content will be ready, and hence greater satisfaction), it is undesirable to subsequently "reschedule" their delivery. Subscribers who receive multiple notifications may become frustrated, much as they would were the MSO to call repeatedly and reschedule installation of their set-top box for example, potentially upsetting the subscribers plans. Accordingly, the aforementioned re-evaluation process of the current embodiment in effect "freezes" issued notices so that all subsequent calculations or predictions are performed on this basis. The process is also iterative, in that predictions are typically based on known delivery events as discussed above, but determination of the known delivery events (e.g., t=X) is dependent on the predictions.

The exemplary algorithm tasked with "matching" requests to delivery modes, resources (e.g., QAMs), projected time slots, etc. (discussed subsequently herein) can be used for this purpose. This process may include reprioritizing various requests based on service level, latency, and numerous other factors, so that in a holistic sense, the most subscribers are kept "happy" and the MSO's operational and/or business goals are met.

Prediction and Detection of Capacity Shortage

Bandwidth is one type of resource required for real-time delivery of content. In the prior art, resource managers for allocating and keeping track of the status of resources are known.

In the present invention, detection of bandwidth shortfall can, be accomplished in many ways. For example, detection can be based on actual bandwidth allocation, predicted bandwidth usage (based for example on historical usage data), and the actual or estimated bandwidth requirement of a current request, or some combination thereof.

In one illustrative example, constant bit rate broadcast and VOD services are offered on a cable system such as that of FIGS. 1-1c previously described herein. When a service request for a VOD session, for example, is received by the system, the bandwidth requirement for the request is determined, and attempts to allocate bandwidth for it from a transport stream. To determine if the requested session can be accommodated by one or more transport streams, the system calculates the unallocated bandwidth in the latter. If sufficient unallocated bandwidth is available, bandwidth can be allocated from that transport stream for the requested session.

If the system is unable to allocate the required bandwidth from any of the transport streams transmitted to the requesting subscriber's location, the system will inform the subscriber that the requested content cannot be delivered immediately. In addition, the system may estimate the time when required bandwidth will be available and provide the estimate to the subscriber.

Such estimation can be made based on historical bandwidth usage data. For example, one simple estimator of bandwidth usage is the recorded bandwidth usage data from the same day and the same general time of the previous week. Recorded bandwidth usage data may take many forms. In one example, the average bandwidth utilized over a time window is recorded for each service every 5 seconds. In the same example, the recorded data also include whether a particular service was transmitted to a particular portion of the cable system (e.g. a fiber node) during a particular time window. Other estimation models and algorithms can be substituted.

Figure 5:
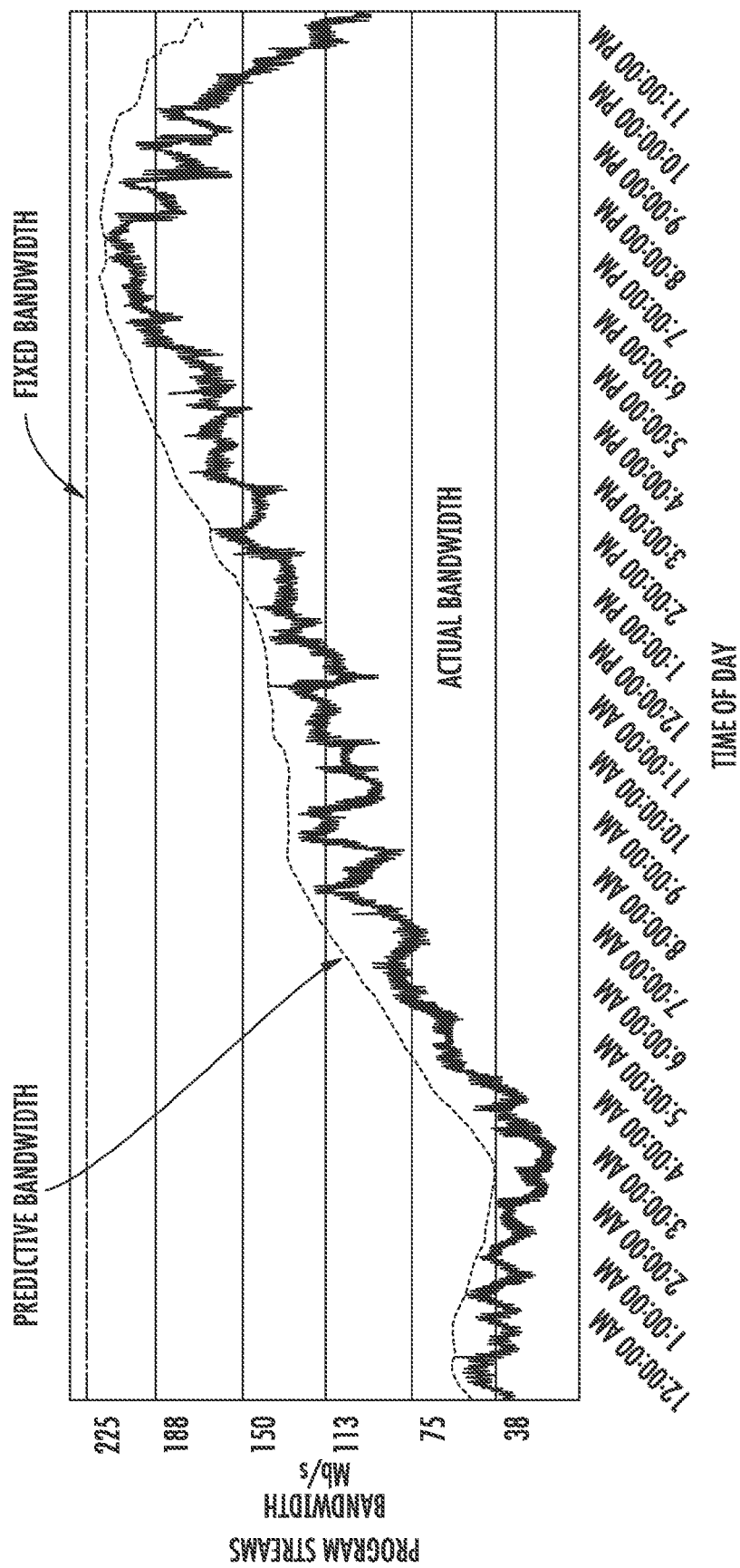
FIG. 5 is a graphical depiction of an exemplary relationship among available bandwidth, predicted bandwidth usage, and actual bandwidth usage, as well as their variation over time, for a typical cable television network.

FIG. 5 is a graphical depiction of an exemplary relationship among available bandwidth, predicted bandwidth usage, and actual bandwidth usage, as well as their variation over time, for a typical cable television network. It will be understood that while described primarily in the context of bandwidth, the principles of the invention are more generally applicable to capacity limiting factors in general, as previously described.

As shown in FIG. 5, the fixed bandwidth 501 will typically be programmed to make available more than needed bandwidth to service requests by subscribers. However, predictive bandwidth 503 serves a more efficient use of bandwidth allocation by slightly over allocating bandwidth to fulfill subscriber requests. The actual bandwidth usage 505 per typical day often tends to steadily increase over the day, and generating the highest level of bandwidth usage during the late evening hours. Also, the number of program streams 509 and time of day 507 reflect the fixed variables for which the diagram depicts bandwidth usage over time.

Exemplary methods for capacity and bandwidth consumption prediction useful with the present invention are disclosed in co-owned and co-pending U.S. patent application Ser. No. 11/243,720 filed Oct. 4, 2005 entitled "SELF-MONITORING AND OPTIMIZING NETWORK APPARATUS AND METHODS", which is incorporated herein by reference in its entirety. In one salient aspect, this disclosure provides a substantially automated and anticipatory mechanism whereby a content-based network, such as a broadcast switched architecture (BSA) network, can effectively "self-monitor" and optimize its bandwidth allocation based on, inter alia, data received from the cable receivers (e.g., DSTBs) within its service area, or from the network as a whole. This approach replaces and substantially improves upon the manual review of activity data, and insertion of operational adjustments, prevalent under prior art network management techniques.

Another aspect of the present invention also relates to the tracking or analysis of historical information for actual delays. For example, in one embodiment, the network operator stores data relating to actual delays imposed by the network in servicing content requests, as well as optionally reasons for the delay (e.g., content unavailable, insufficient bandwidth, transcoding, etc.). This information can be readily gleaned from the notification engine (e.g., server software process 252 running on MSO server or other device that generates the notifications, or sends the information to the CPE for local generation). The subscriber's CPE 106 may also be equipped to gather information for their machine or services (see discussion of client process 254 previously presented), which can be transmitted back upstream or to a designated proxy (e.g., web server) in real-time, on a delayed bases, as an aggregated (e.g., daily, weekly, per X startups, etc.) data file or metadata, and so forth.

The foregoing delay information can be used for any number of purposes including inter alia predicting future delays. As a simple example, if historical data for a given parameter (e.g., network hub, subscriber, type of CPE, subscription or service level, time of day, date, type of requested programming, selected delivery channel or mode, etc., or combinations of the foregoing) indicates that delays are normally (Gaussian) distributed with respect to a mean/median value, then the network operator or supervisory process can use this information in configuring subscriber notifications. In one variant, the subscriber notification comprises a fuzzy logic representation; e.g., "You have a high/medium/low probability of obtaining the content you requested if you request again after 10:00 pm", the assigned logic level being determined based on predetermined thresholds for the aforementioned probability distribution. Similarly, the notification might read "Your requested content should be available after 10:00 pm". The confidence or probability level ascribed to a notification may also be coupled to the consideration paid for the content; e.g., the user might receive a discount, "Time Warner Points", incentives, etc. in trade for less certainty on the availability of content. This creates the ability for opportunistic selection by a subscriber. As is known in the prior art, many cable or satellite providers will discount movies or content (e.g., PPV) when that content is sufficiently aged or otherwise less desirable (perhaps due to less topical relevance, etc.). However, the prior art does not provide the subscriber the ability to discount their purchases (or subscriptions) by in effect being more flexible about when they receive or view the content. Subscribers on a budget or with less restrictive schedules might be willing to use a service that provides less-than-timely "on demand" services (e.g., LTTVOD). This selection or choice by the subscriber may be made on an anecdotal or per-request basis (subscribers may be willing to elect the LTTVOD option for certain situations or types of programming or content), or as a blanket or predetermined choice (for example, as a part of their subscription establishment process, or as a periodic preference choice solicited by the MSO). This selection may be situationally and/or temporally tailored or applied; e.g., election of LTTVOD for any content requested before 6:00 pm on any given day, not on any holidays or weekends, and so forth.

The present invention further contemplates the ability of the MSO or other network operator (or its proxy) to schedule delivery of delayed content based on anecdotal or historical information specific to the requesting subscriber. For example, where the subscriber's historical patterns indicate that they only watch movies from 6:00 pm to 11:00 pm on any given day, delivery within this window (e.g., at the front end) might be prioritized. Hence, this information can be factored into when to service that subscriber's request with respect to that of another (perhaps one more variable in their viewing habits).

Request/Bandwidth Matching

In another aspect, the present invention can be configured to perform logical "matching" of requests to projected or known capacity opportunities. For example, if five (5) different recent requests are queued and awaiting bandwidth, the bandwidth management and notification process of the present invention can evaluate each of the requests (or subsets thereof) so as to profile or characterize them with respect to one or more parameters of interest including e.g., size of download, QoS or quality requirements (i.e., is the content potentially lossy or not), current latency since time of request by the subscriber, subscription or service level of the requesting subscriber (e.g., premium, basic, LTTVOD-elected, etc.), subscriber notification preferences, and subscriber CPE capabilities and configuration (e.g., number of tuners, DVR capability, processor speed, middleware or O/S, etc.). Then, based on evaluation of the parameter(s), individual requests can be matched to network capabilities so that delivery of all (or a subset) of the requests are optimized. In one simple illustrative case, requests from subscribers who have elected LTTVOD delivery (e.g., don't care much when the content shows up) would be set to a lower priority, and matched or allocated to a trickle or opportunistic mode beginning at a far-future time slot. Premium subscribers who have elected a specific delivery time might be matched to the next high-speed VOD-based download window as previously described. Likewise, streaming or time-sensitive content would not be matched to an opportunistic modality, since continuity could not be guaranteed.

Conversely, an anonymous approach to content requests can be employed, such as where the subscriber desires privacy for the content they have requested. In such case, the network operator may be somewhat "hamstrung" from evaluating one or more of the foregoing parameters for purposes of matching or prioritization, since some implicitly require correlating a given request with a given subscriber. Co-owned and co-pending U.S. patent application Ser. No. 11/186,452 filed Jul. 20, 2005 and entitled "METHOD AND APPARATUS FOR BOUNDARY-BASED NETWORK OPERATION", incorporated herein by reference in its entirety, describes exemplary approaches for implementing anonymous CPE or subscriber identification (e.g., via a one-way cryptographic hash and TUNER USE, TUNER ID, and opaque variables), which can be used consistent with embodiments of the present invention to allow for more efficient request/bandwidth matching even while enforcing complete anonymity.

Notifications can likewise be anonymous; e.g., issued to a given TUNER ID, MAC, etc., or to an e-mail address or text message address that is associated with the opaque variable for a subscriber's CPE (as opposed to a particular subscriber per se). Moreover, the notifications can be made completely non-descript as to what content has been requested (e.g., adult content); this can be imposed irrespective of whether the aforementioned anonymity measures are employed. This approach avoids potentially embarrassing or unwanted situations where a subscriber's children, parents, etc. receive a notification destined for the subscriber. Also, indication of content may be provided discreetly, for example, requiring a Personal Identification Number (PIN) or other authentication/challenge in order to access the notification (or details relating thereto).

As can be appreciated, the foregoing logic can be implemented algorithmically by those of ordinary skill, such as via a software process running on a network server (e.g., as part of the aforementioned notification engine) or other network entity. This process can also be proxied to a third party, such as a web server, which might for example specialize in optimizing and customizing user notifications and request management.

The bandwidth evaluation and management apparatus and methods of the present invention can also be used if desired in conjunction with multiplexing algorithm and wideband tuner apparatus such as that described in co-owned and co-pending U.S. patent application Ser. No. 11/013,671 filed Dec. 15, 2004 and entitled "METHOD AND APPARATUS FOR WIDEBAND DISTRIBUTION OF CONTENT", incorporated herein by reference in its entirety. In this disclosure, an exemplary wideband tuner approach which allocates a program stream across multiple QAMs so as to, inter alia, increase statistical multiplexing pool efficiency, is employed. Accordingly, certain types of delivery modes described herein (i.e., streaming or download) may be enhanced through the distribution of the content across bandwidth associated with multiple QAMs.

Contention Management

In another embodiment of the invention, an approach somewhat akin to medium access and backoff procedures in data networks is used (at a logical level) to mitigate or resolve bandwidth contention. For example, where a "collision" is detected (e.g., two or more CPE requesting the same or different content which would cause a contention for available bandwidth), a prioritization (e.g., backoff) algorithm is used to prioritize these requests. In one variant, requests are assigned a time slot, or alternatively a priority value (which may be agnostic of temporal considerations or coordinates) according to a random or pseudo-random generation algorithm of the type well known in the communications arts. For example, assuming five (5) requests are received at the same time, and available capacity can only service two (2) of these requests, each of the five requests would be assigned a randomly generated priority number (each different), so that the highest priority request would be serviced first, second highest next, and so forth. Notification for the three (3) requests that could not be immediately serviced could then be generated (as opposed to generating five notifications with delays varying from zero to a given amount). Note that the assignment of priority need not be random (or at least completely) either, but rather may be performed according to one or more policies or rules (e.g., business-related rules or policies such as servicing premium subscriber's requests first, and then prioritizing the remaining contending requests according to another scheme such as random backoff or priority). Myriad schemes for prioritizing a plurality of requests that may be used consistent with the invention will be recognized by those of ordinary skill given the present disclosure.

In another variant, the requests are not prioritized per se, but rather assigned a randomly generated backoff interval or delay, so as to stagger the requests. This in effect makes the requests seem as if they were each received at a different time. The assigned backoff delay or staggering function can also be a function of network operational metrics, such as available capacity/bandwidth. For example, the backoff delay can be lengthened where available capacity is low (and perhaps anticipated to be low for an appreciable period of time), whereas the delay can be shortened if the bandwidth constraints are more transient.

Moreover, the delays assigned to successive requests in the backoff sequence need not be identical or linear, but can be made a function of their position in the sequence. For example, the first delay might comprise X minutes, the second X+Y($s_1$) minutes, the third Z($s_2$) minutes, and so forth, where Y($s_1$) and Z($s_2$) are functional relationships of capacity or other variables $s_1$ and $s_2$, respectively. Rate of change of bandwidth consumption, for example, might comprise one of the variables ($s_1$ or $s_2$) upon which the delay function is based, although it will be appreciated that many other variables or parameters (or combinations thereof) may be used consistent with the invention.

Notification Preferences and Processing

Various embodiments of the present invention utilize the previously described notification as being transmitted to the CPE (e.g., DSTB) of the subscriber, but notifications may be alternatively delivered by any number of other mechanisms including without limitation e-mail, fax, text message, instant message or SMS, WAP push, or telephone call. Furthermore, the notification of different types of content may be delivered differently, as described in greater detail below.

The notification channel hierarchy or selection process can also be configured to a specific subscriber's needs if desired. For example, a subscriber who has requested content that is unavailable that he and his date for the evening want to watch immediately, would certainly want to be notified via a mechanism that provides the notification in a timely and convenient fashion. In the foregoing date scenario, the subscriber might, when confronted with non-availability of the content when requested, choose to take his date to the local coffee shop or bar for a drink until the content is available. However, it does him no good to receive notification via his CPE 106 (STB) in this case, since he is not there to monitor it. Hence, the MSO utilizing the present invention can allow its subscribers the ability to set notification preferences according to a hierarchy or order-of-use, which can be invoked and readily changed by the subscriber as their personal situation changes. Hence, under such a scenario, the aforementioned subscriber would in one embodiment elect a notification profile (e.g., from a set of stored profiles), and enforce the policies contained therein. Such policies might be for example: (i) cellular call or page first, but if unavailable, (ii) text message. This way, he would receive the call/page/text while at the coffee shop or bar, and he and his date could then return and watch the movie, knowing that it was in fact available. Retry functionality is also contemplated; e.g., where the subscriber can specify n number of retries (or a time duration for retry) before changing notification modality.

Another configuration might simply present the user with easily recognized and selected icons for cellular telephone, CPE (e.g., DSTB), Personal Computer, etc. via a GUI or AUI (audible user interface), and the user simply clicks on their preferred modality for notification.

Moreover, the present invention contemplates allowing the subscriber to remotely configure or reconfigure their notification preferences, such as via a client process running on their smartphone, PDA, handheld computer, laptop, and so forth. Such communication from the remote or mobile process to the MSO or responsible notification entity can be accomplished using any number of different well known technologies, such as via wireless interface, cellular network, satellite uplink, DSL or cable modem, instant messaging, and so forth. See, e.g., the methods and apparatus described in co-owned and co-pending U.S. patent application Ser. No. 11/258,229 "METHOD AND APPARATUS FOR ON-DEMAND CONTENT TRANSMISSION AND CONTROL OVER NETWORKS" filed Oct. 24, 2005 and incorporated herein by reference, wherein various wireless and cellular content delivery and communication paradigms are described in detail, such paradigms enabling communication between mobile users and MSO network infrastructure. Myriad other approaches may be used with equal success, however. This remote configuration capability allows the subscriber to change their preferences "on the fly", such as when their personal situation or plans change, and they are not located at their residence or CPE delivery point.

Note also that remote content delivery options may also be used consistent with the invention, such as e.g., the apparatus and methods described in co-owned and co-pending U.S. patent application Ser. No. 11/440,490 filed May 24, 2006 and entitled "PERSONAL CONTENT SERVER APPARATUS AND METHODS", incorporated herein by reference in its entirety, may be used to provide remote delivery via, e.g., a personal content server. Likewise, notification functions (both from the network end and the subscriber end) can be "slung" remotely, so that the subscriber's content delivery and notification experience at the remote location is seamless and completely consistent with that available at their primary location (e.g., residence).

Additionally, the notification mechanisms described above can be paralleled or multicast based on supervisory or parental control policies. For example, where a minor requests content from the MSO (assuming any other parental controls or restrictions have been successfully bypassed or overcome), and the content is delayed in delivery, the subscriber; i.e., minor's parent(s), can specify a parallel notification policy wherein the parent is notified via a dedicated or prescribed channel in addition to that specified by the minor at time of request. Hence, the parent can stay apprised of what the minor is requesting. The non-descript notification function (described subsequently herein) can also be overridden for such parental notifications, thereby allowing the parent at all times to determine specifically what content was requested.

Certain types of content can also be flagged for different processing (whether by the sending entity; e.g., notification engine, or by the receiving device such as the parent's PC or cellular telephone) based on the type of content, immediacy of impending delivery, cost of servicing the request, etc. For example, notifications bearing metadata or other information indicating that the requested content comprises an adult movie would generate a visual and/or audible alarm or alert for the parent. Similarly, content requests that are nearly at the point of being serviced might be given a different processing (e.g., yellow highlighting, exclamation point, warning tone, etc.) than those which are not. Likewise, high-cost transactions (e.g., request to purchase via download a copy of a new release movie, such as via the methods and apparatus of co-owned and co-pending U.S. patent application Ser. No. 11/080,693 filed Mar. 14, 2005 entitled "METHOD AND APPARATUS FOR NETWORK CONTENT DOWNLOAD AND RECORDING", incorporated herein by reference in its entirety) can be flagged and processed differently.

Moreover, the notification and other functions can be made "parent-permissive"; i.e., actual delivery of the content requested by the minor can be disabled or permitted based on an affirmative communication (e.g., e-mail or text message, WAP message, acknowledgment of an on-screen prompt, selection made at a website, etc.) or assent from the parent regarding the suitability of the content or impending purchase.

As yet another alternative, no availability notification is provided for certain classes or types of content (e.g., adult content). In this approach, the subscriber will only learn of the availability of the previously requested content by requesting it again. Since only the requesting subscriber (individual) will know that the content has been requested once already, another (unaware) individual would not see the notification unless they themselves requested that same content again.

As another option, the availability indication of adult content may be made to persist for a relatively short duration, in example, no more than one hour from the initial request. This may be done to prevent children in the subscriber household from accidentally receiving availability notifications not intended for them.

It will be appreciated that while the foregoing discussion is cast in terms of parental controls, it can be readily adapted to other paradigms; e.g., enterprise (a supervisor or boss evaluating an employee's content delivery requests), military/governmental (a senior officer or entity evaluating a junior's content delivery requests), and so forth.

Notification may also be multicast to multiple subscribers at the same time, such as where numerous parties have requested a given content element (e.g., movie or game), which was unavailable at the time of request. This approach economizes on overhead associated with otherwise sending out n individual notifications to each of the n requesters.

It will be appreciated that while many of the embodiments of the invention are described in terms of a notification of content availability time/date (i.e., when the content is ready for streaming or download), the invention may be readily adapted in the alternative (or even as a complementary function) to operate relative to when the content is available for viewing or use by the subscriber, which may or may not be the same. For example, one delivery paradigm previously described comprises transmission of a stream of encoded data (e.g., MPEG2 packets), which can be received, decoded, and displayed effectively on-the-fly to the user. However, another delivery paradigm comprises download of a file or content element (e.g., game, movie, audio file, etc.) to the requesting device or its designated proxy, with subsequent playback or use once the entire file is downloaded. Hence, notification under this latter approach can occur either when the file is ready for download (i.e., when the network has capacity to transmit it), or when it has actually been successfully received by the CPE or other client device, or both.

Moreover, it will be recognized that the notification and evaluation mechanisms of the present invention can used for delivery of elements other than traditional "content". For example, a downloadable conditional access/digital rights management (DRM)/trusted or authorized service domain (TD or ASD) system can make use of the methods and apparatus disclosed herein for delivery of CA/DRM/TD downloads, the latter which may also be contingent on available capacity or bandwidth. See, e.g., co-owned and co-pending U.S. patent application Ser. No. 11/584,208 filed Oct. 20, 2006 entitled "DOWNLOADABLE SECURITY AND PROTECTION METHODS AND APPARATUS", and U.S. patent application Ser. No. 11/657,828 filed Jan. 24, 2007 entitled "APPARATUS AND METHODS FOR PROVISIONING IN A DOWNLOAD-ENABLED SYSTEM", each of the foregoing incorporated herein by reference in its entirety. Contacting a trusted authority (TA) for key service and authentication, provisioning a downloadable CPE, creating common and personalized images of software, etc. can involve some degree of latency, and hence provides opportunities for notification of delays to subscribers so as to inter alia, reduce their uncertainty and frustration.

Similarly, transcoded content (e.g., where the requested content must be coded from one codec to another before delivery), applications, software/firmware updates, and other elements may be subjected to notification policies and delayed delivery approaches as described herein.

Network Server

Figure 6:
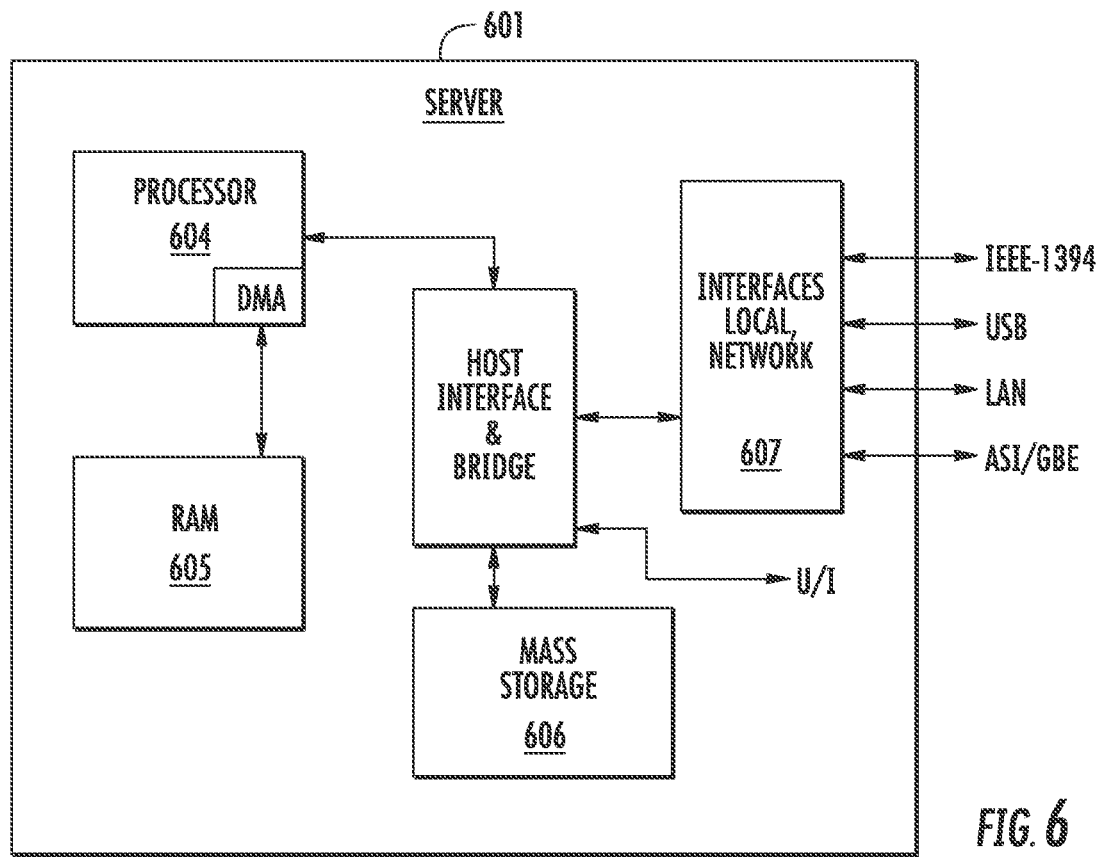
FIG. 6 is a functional block diagram illustrating an exemplary embodiment of a network server device with capacity detection and notification functionality according to the invention.

Referring now to FIG. 6, one embodiment of the improved network server device with capacity evaluation and notification capability according to the present invention is described. As shown in FIG. 6, the device 601 generally comprises and OpenCable-compliant BSA network server module 196 adapted for use at the hub site of FIG. 1c, although the server may comprise other types of devices (e.g., VOD or application servers) within the network as previously described, including those at the headend 150.

The server 601 comprises a digital processor(s) 604, storage device 606, and a plurality of interfaces 607 for use with other network apparatus such as RF combiners, IP routers and other packet network devices, network management and provisioning systems, local PCs, etc. Other components which may be utilized within the server device 601 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the server 301 and the CPE. The server process application 252 (FIG. 2a) is also disposed to run on the server module 601, and can be configured to provide a functional interface with the client process 254 on the network CPE 106 (where used), or other interposed or remote entities. These components and functionalities are well known to those of ordinary skill in the cable and embedded system fields, and accordingly not described further herein.

The server device 601 of FIG. 6 may take any number of physical forms, comprising for example one of a plurality of discrete modules or cards within a larger network edge or hub device of the type well known in the art. The server may also comprise firmware, either alone or in combination with other hardware/software components such as those previously described (e.g., disposed in the aforementioned edge device). Alternatively, the server module 601 may be a stand-alone device disposed at the hub or other site, and may even include its own RF front end (e.g., modulators, encryptors, etc.) or optical interface so as to interface directly with various portions of the HFC network 101. Numerous other configurations may be used. The server device 601 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the capacity analysis and notification generation functionality described above may take the form of one or more computer programs (e.g., the server and client processes, 252, 254). Alternatively, such computer programs may have one or more components distributed across various hardware environments at the same or different locations, such as where the server process 252 is distributed across multiple platforms at the hub site and the headend 150.

As yet another example, portions of the functionality may be rendered as a dedicated or application specific IC having code running thereon. Myriad different configurations for practicing the invention will be recognized by those of ordinary skill in the network arts provided the present disclosure.

CPE

Figure 7:
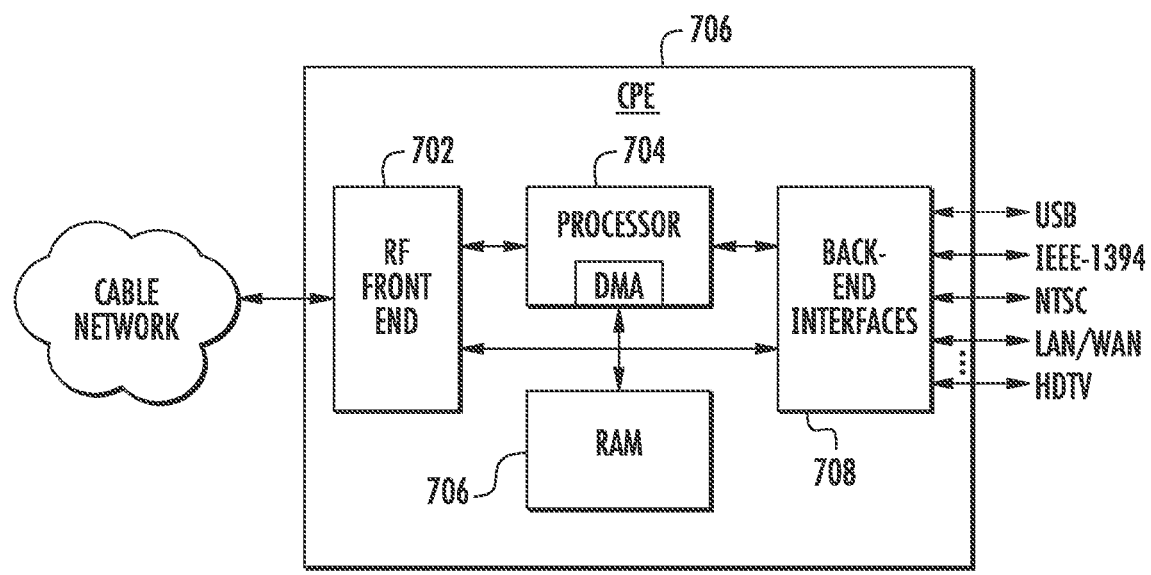
FIG. 7 is a functional block diagram illustrating an exemplary embodiment of CPE with notification functionality.

FIG. 7 illustrates an exemplary embodiment of the improved CPE 106 according to the present invention. As shown in the simplified diagram of FIG. 7, the device 106 generally comprises and OpenCable-compliant embedded system having an RF front end 702 (including tuner and demodulator/decryptors) for interface with the HFC network 101 of FIGS. 1-1c, digital processor(s) 704, storage device 706, and a plurality of interfaces 708 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 7 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 7 is also provided with an OCAP 1.0-compliant application and Java-based middleware which, inter alia, manages the operation of the device and applications running thereon (including the client process application 254 where used). It will be recognized by those of ordinary skill that myriad different device and software architectures may be used consistent with the tuning functions of the present invention, the device of FIG. 7 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the client process 254.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety.

Business Methods and "Rules" Engine

In another aspect of the invention, the aforementioned server process 252 (e.g., rendered as one or more computer programs) optionally includes a business rules engine. This engine comprises, in an exemplary embodiment, a series of software routines running on the server device 601 or other associated hardware/firmware environment adapted to control the operation of the detection, evaluation, optimization and notification algorithms previously described. These rules may also be fully integrated within the server process 252 itself, and controlled via e.g., a GUI on a PC connected to the server 601. In effect, the business rules engine comprises a supervisory entity which monitors and selectively controls, via the server process 252 and/or CPE process 254, the detection, analysis, optimization and notification functions at a higher level, so as to implement desired operational or business rules. The rules engine can be considered an overlay of sorts to the algorithms of the server process 252 previously described. For example, the server process 252 may invoke certain operational protocols or decision processes based on data received from the CPE 106 (e.g., subscriber notification preferences), as well as network operational or historical data, demographic data, geographic data, etc. However, these processes may not always be compatible with higher-level business or operational goals, such as maximizing profit or system reliability. Hence, when imposed, the business/operational rules can be used to dynamically (or manually) control the operation of the server process 252 (and/or client process 254), in conjunction with the operational "recommendations" generated by the server process 252 as part of its analysis and notification functions previously described.

For example, one rule implemented by the rules engine may comprise selectively servicing (or at least queuing first) requests from certain users first; e.g., those with a higher subscription priority or level under bandwidth-limited cases, and only after this tier of users is satisfied, servicing remaining content requests.

Another rule might allow for the relegation of low-priority requests to the back of the service queue; e.g., those associated with subscribers who have elected to receive content on a less-than-timely (LTT) basis as previously described. Such subscribers effectively do not care when they receive the content (within certain constraints, obviously), and hence the MSO can prioritize other requests first.

Similarly, capacity (e.g., bandwidth) for servicing requests can be allocated to those users which, e.g., based on demographics, historical patterns, geographic area, etc. will make best use of the bandwidth in terms of monetary return, profit, or some other business performance metric. For example, the MSO might invoke a business rule that selectively services requests for the best or most lucrative zip codes (or demographic slices) first. Such switching to certain zip codes can be performed using, inter alia, the methods and apparatus set forth in U.S. patent application Ser. No. 11/186,452 entitled "METHOD AND APPARATUS FOR BOUNDARY-BASED NETWORK OPERATION", previously referenced and incorporated herein.

Many other approaches and combinations are envisaged consistent with the invention, as will be recognized by those of ordinary skill when provided this disclosure. An example is the application of business rules based on content or content-provider related metrics versus those of the subscriber. For example, prioritization or servicing of certain requests might be based on the content that is requested. In one variant, if multiple requests are for the same content, and this content can be delivered efficiently to all requesters (e.g., economy-of-scale) versus servicing multiple heterogeneous requests which would consume more bandwidth, then these requests would be prioritized and serviced. In effect, this gives the MSO the most "bang for the buck" in terms of allocating its bandwidth.

Conversely, where the requests are homogeneous (e.g., for the same content), yet cannot be serviced any more efficiently than heterogeneous requests, one or more of the requesting subscribers may be foisted off to a peer CPE 106 or other such device within the network (for example, within the requesting subscriber's service group or hub), such peer having the requested content. The peer can then either: (i) provide the requested content in its entirety if it is in a position to do so (i.e., up and operational, content is intact, not being presently used, subscriber of the peer has authorized transfer, etc.); or (ii) provide a "rolling start" for delivery, during which the delivery can be handed off to a headend or hub entity (e.g., BSA server, VOD server, etc.) when sufficient downstream bandwidth becomes available, such as via communication between the peer's client process 254 and the server process 252 of FIG. 2a.

Enforcement of the foregoing business rules may be executed by servers separately for each service (e.g. BSA or VoD) or centrally via the controlling actions of a master SRM (Session and Resource Manager) or other agent.

Alternatively, the content source can be considered as a basis for servicing subscriber requests. For example, in one embodiment, content providers (e.g., studios, etc.) would pay a premium or provide other incentives to the MSO to have requests for their content serviced first (where sufficient capacity does not immediately exist), so as to give requesting subscribers the best possible image of the content source (which from a subscriber's perspective may be indistinguishable from the MSO; a user may merely remember e.g., that they could not get the content they wanted on HBO when they wanted it, irrespective of the fact that it may have been the MSO network which caused the delay).

The notification functions described herein also give the opportunity for advertising revenue by the MSO; e.g., such as where the notification comprises a pop-up window or other graphical device that includes an icon, symbol/trademark, catch-phrase, banner, audio device or sound (e.g., NBC three-tones) etc. This can be charged on a per-view (i.e., per notification basis) to the advertiser, hence providing enhanced revenue as more notifications are sent and viewed. While content delivery delays are certainly not desirable, the MSO can at least make the best of them by obtaining revenue from their use.

The aforementioned advertising in the notification may also be related (topically, temporally, etc.) to the requested content, such that there is a logical proximity between the content and the advertising. See e.g., co-owned and co-pending U.S. patent application Ser. No. 11/441,476 filed May 24, 2006 entitled "SECONDARY CONTENT INSERTION APPARATUS AND METHODS", incorporated herein by reference in its entirety, for discussion of logical proximity and various methods for advertising content insertion.

In another variant, the subscriber is provided with the opportunity to "trickle" download the content (which may be at an unpredictable rate, and/or be completed at an unpredictable time) in exchange for, e.g., a discount or other such consideration. This approach allows the network operator an added degree of control and flexibility in managing network bandwidth, since such requests can be serviced opportunistically.

In still another variant, the apparatus and methods of the invention are adapted to provide timely notification to e.g., subscribers of the MSO network regarding the availability of new content. For example, in one embodiment, the network operator broadcasts or otherwise provides its subscribers with advance notice of the impending release of new content (e.g., "Snakes on a Plane . . . available for viewing and download purchase soon". As part of this notice, the subscribers may be provided the opportunity to "select" the content for notification when it actually becomes available, the date of which may be known or not. Such selection may occur, for example, via on-screen menu, pop-up window, EPG, etc., such as by the user selecting a menu option for "Notify Me". The network operator (e.g., server process 252 of FIG. 2a) will then remember the subscriber's selection, and monitor for the availability of the content (such as via a look-up table, database, received message from a content source, or other such mechanism), at which point the subscriber will be issued a second notification; i.e., that the content of interest is now available. In this fashion, the subscriber does not have to keep "checking back" to see if the content has been released; they can rather be notified immediately via any of the aforementioned modalities (e.g., cellular phone, SMS, WAP push, e-mail, and so forth).

Moreover, the subscriber's selection need not be solely in response to a first notification or promotion by the MSO (or a third party source); rather, the MSO can list the content in an electronic program guide (EPG) or the like, with perhaps an indication of future availability only (e.g., using a different color, icon, etc.). The user can then select this content (whether via PPV, VOD, broadcast, download and burn to DVR, CD-ROM, or other delivery mode), and then be notified when it is ready for delivery.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of providing notification in a content distribution network, said method comprising:
   receiving a request for delivery of content from an entity in communication with said content distribution network;
   evaluating at least one parameter related to available bandwidth of said content distribution network;
   when said evaluating indicates that said available bandwidth is limited, utilizing recorded bandwidth usage data to predict a first future time window when bandwidth will be available for delivery of said requested content; and
   immediately subsequent to said act of evaluating, providing at least two selectable content delivery options and an option to receive a notification at second future time relating to said requested content being available;
   wherein said at least two selectable content delivery options comprise at least one option for streamed delivery and at least one option for download delivery of said requested content, said streamed or download delivery occurring at a user specified time within said predicted first future time window.

2. The method of claim 1, wherein said content distribution network comprises a cable television network, and said request for content comprises a signal or message received from a subscriber of said content distribution network issued via their consumer premises equipment (CPE).

3. The method of claim 1, wherein said evaluation of at least one parameter related to available bandwidth is based at least in part on actual bandwidth allocation then existing within said content distribution network.

4. The method of claim 1, wherein said notification comprises an audio, text, and/or graphical indication presented to a user via a display device in signal communication with said content distribution network.

5. The method of claim wherein said notification comprises an electronic message sent over an Internet.

6. The method of claim 1, wherein said notification comprises an electronic message sent over a wireless or cellular service network.

7. The method of claim 1, wherein said notification of a first type of said requested content can be configured differently from a second type of said requested content.

8. A network apparatus adapted to provide notification in a content distribution network, said network apparatus comprising:
   a network interface adapted to communicate with at least one user device;
   a storage apparatus; and
   a processor in data communication with said storage apparatus and said network interface, said processor adapted to run at least one computer program thereon, said at least one computer program comprising a plurality of instructions which are adapted to, when executed, cause said network apparatus to:
   receive a request for delivery of content from said at least one user device in communication with said content distribution network;
   evaluate at least one parameter related to available bandwidth of said content distribution network;
   when said evaluation indicates that said available bandwidth is limited, utilize recorded bandwidth usage data to predict a first future time window when bandwidth will be available for delivery of said requested content; and
   immediately subsequent to said evaluation, provide at least two selectable content delivery options and an option to receive a notification at second future time relating to said requested content being available;
   wherein said at least two selectable content delivery options comprise at least one option for streamed delivery and at least one option for download delivery of said requested content, said streamed or download delivery occur at a user specified time within said predicted first future time window.

9. The network apparatus of claim 8, wherein said content distribution network comprises a cable television network, and said request for content comprises a signal or message received from a subscriber of said content distribution network issued via their consumer premises equipment (CRE).

10. The network apparatus of claim 8, wherein said evaluation of at least one parameter related to available bandwidth is based at least in part on actual bandwidth allocation which currently exists within said content distribution network.

11. The network apparatus of claim 8, wherein said notification comprises an audio, text, and/or graphical indication presented to a user via a display device in signal communication with said content distribution network.

12. The network apparatus of claim 8, wherein said notification comprises an electronic message sent over an Internet.

13. The network apparatus of claim 8, wherein said notification comprises an electronic message sent over a wireless or cellular service network.

14. The network apparatus of claim 8, wherein said notification of a first type of said requested content can be configured differently from a second type of said requested content.

* * * * *

UNITED STATES PATENT AND TRADEMARK OFFICE
CERTIFICATE OF CORRECTION

PATENT NO. : 9,270,944 B2  
APPLICATION NO. : 11/706620  
DATED : February 23, 2016  
INVENTOR(S) : Paul D. Brooks et al.

It is certified that error appears in the above-identified patent and that said Letters Patent is hereby corrected as shown below:

In the Claims

Currently reads (Claim 5 - Column 36):
"5. The method of claim wherein said notification comprises an electronic message sent over an Internet."

Should read:
--5. The method of claim 1, wherein said notification comprises an electronic message sent over an Internet.--

Signed and Sealed this
Third Day of January, 2017

Michelle K. Lee
*Director of the United States Patent and Trademark Office*